United States Patent
Maier et al.

(10) Patent No.: US 7,037,050 B1
(45) Date of Patent: May 2, 2006

(54) MILLING HEAD WITH ONE TO THREE-DIMENSIONAL ADJUSTABLE CUTTING INSERT AND WITH A POSITIVE FITTING CUTTING INSERT

(75) Inventors: Andreas Maier, Schwendi-Horenhausen (DE); Wilfried Eble, Friesenheim (DE)

(73) Assignee: Hartmetallwerkzeugfabrik Andreas Maier GmbH, Schwendi-Horenhausen (DE)

( * ) Notice: Subject to any disclaimer, the term of this patent is extended or adjusted under 35 U.S.C. 154(b) by 0 days.

(21) Appl. No.: 09/582,626

(22) PCT Filed: Jan. 7, 1999

(86) PCT No.: PCT/DE99/00015

§ 371 (c)(1),
(2), (4) Date: Jul. 5, 2000

(87) PCT Pub. No.: WO99/34948

PCT Pub. Date: Jul. 15, 1999

(30) Foreign Application Priority Data

Jan. 8, 1998 (DE) ................................ 198 00 440

(51) Int. Cl.
*B26D 1/00* (2006.01)
(52) U.S. Cl. .......................................... 407/35; 407/39
(58) Field of Classification Search ........... 407/35–41, 407/43–46, 118, 119
See application file for complete search history.

(56) References Cited

U.S. PATENT DOCUMENTS

| | | | |
|---|---|---|---|
| 1,945,854 A * | 2/1934 | Hall | 407/39 |
| 2,846,757 A | 8/1958 | Klosterkemper | |
| 3,013,450 A * | 12/1961 | Yogus | 408/153 |
| 3,027,624 A * | 4/1962 | Payne | 407/37 |
| 3,087,230 A * | 4/1963 | Comire | 407/108 |
| 3,461,751 A * | 8/1969 | Dupuis | 408/162 |
| 3,644,050 A * | 2/1972 | Schiller | 408/197 |
| 4,043,229 A * | 8/1977 | Ortlieb | 82/139 |
| 4,605,343 A * | 8/1986 | Hibbs et al. | 407/119 |
| 4,627,771 A | 12/1986 | Kieninger | |
| 4,692,069 A | 9/1987 | Kieninger | |
| 4,708,537 A * | 11/1987 | Elka et al. | 407/46 |
| 4,929,131 A | 5/1990 | Allemann | |
| 4,964,763 A | 10/1990 | Kieninger | |
| 5,201,613 A | 4/1993 | Jeffery | |
| 5,320,458 A * | 6/1994 | Reiterman et al. | 408/180 |
| 5,336,026 A * | 8/1994 | Noggle | 408/147 |
| 5,605,420 A * | 2/1997 | Feldsine | 407/32 |
| 5,863,156 A * | 1/1999 | Satran et al. | 407/36 |
| 5,934,842 A * | 8/1999 | Gupta | 407/40 |
| 5,967,705 A * | 10/1999 | Wermeister | 407/39 |

FOREIGN PATENT DOCUMENTS

| | | |
|---|---|---|
| DE | 2140004 | 2/1973 |
| DE | 2309430 | 9/1974 |
| DE | 3007322 | 9/1981 |
| DE | 3140905 | 5/1983 |
| DE | 3236921 | 11/1993 |
| EP | 0744242 | 11/1996 |
| GB | 2103975 | 3/1983 |

* cited by examiner

*Primary Examiner*—Henry W. H. Tsai
(74) *Attorney, Agent, or Firm*—Dennison, Schultz, Dougherty & MacDonald

(57) ABSTRACT

A milling head is provided having a basic body and cutting inserts which can be adjusted in the basic body in recesses and are clamped down by a clamping element which is disposed in the recesses.

19 Claims, 23 Drawing Sheets

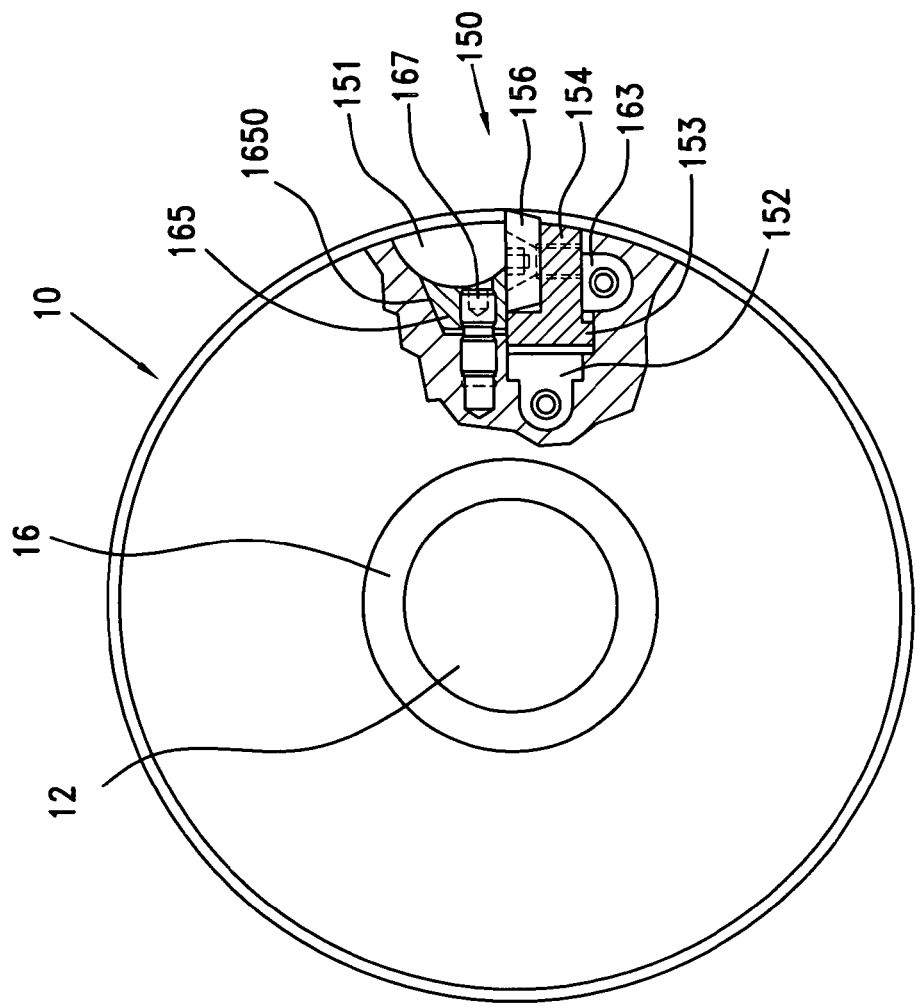
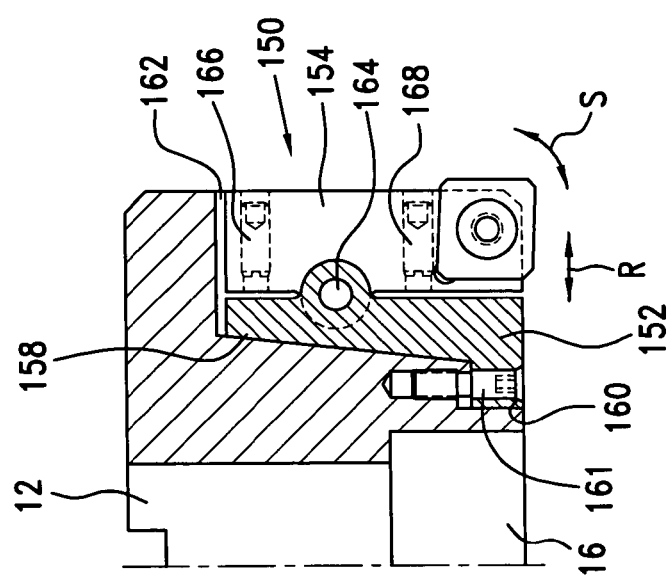

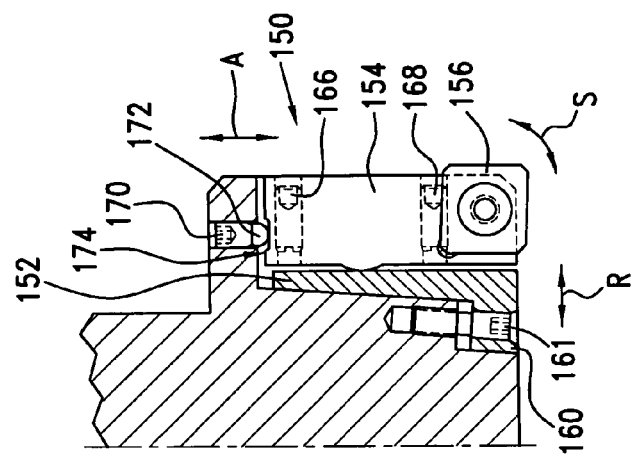
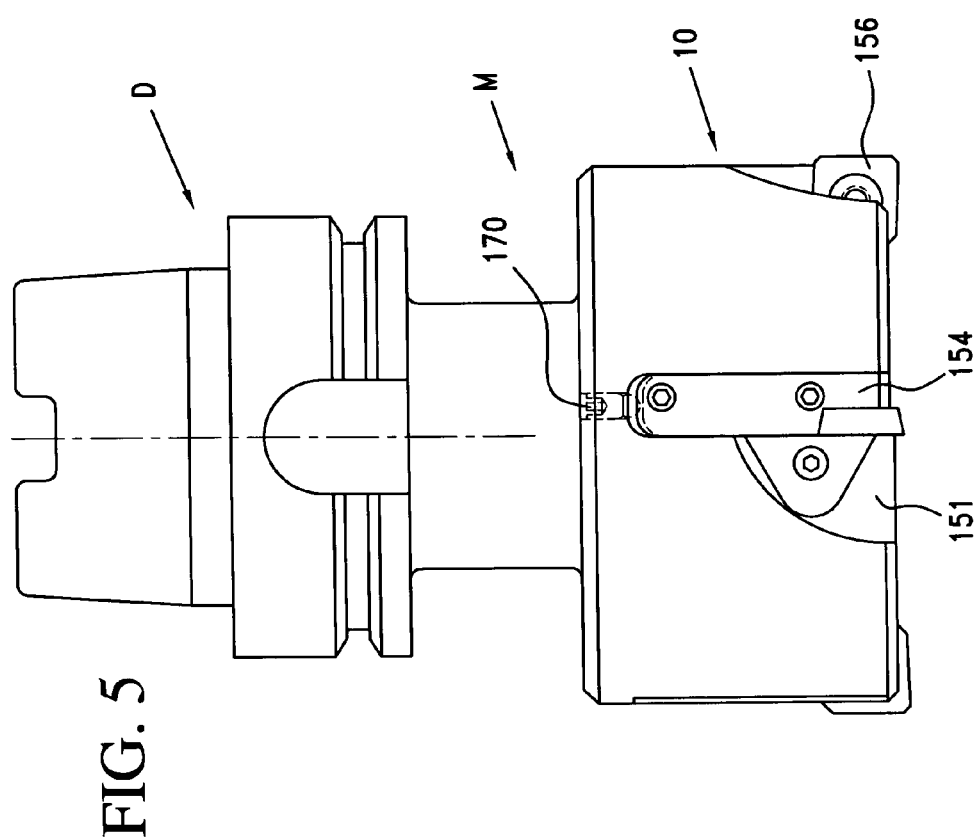

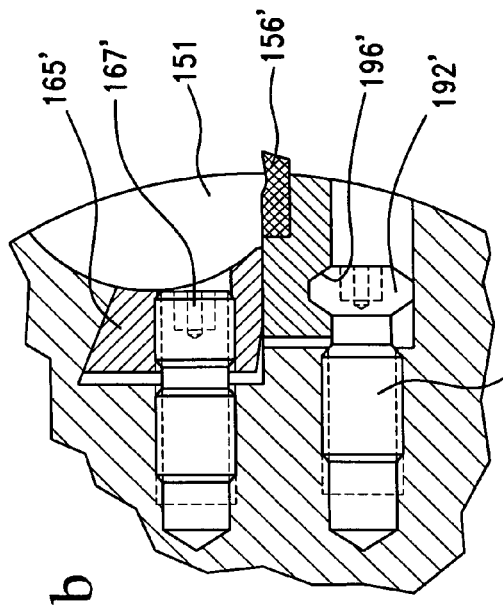
FIG. 8a
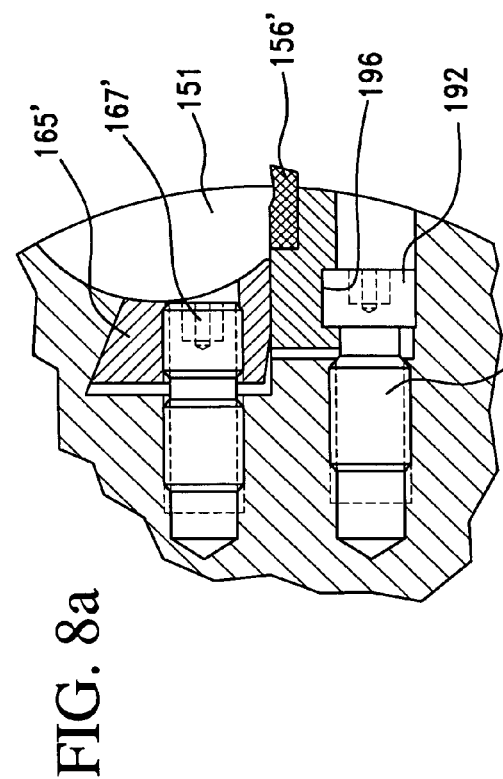
FIG. 8b
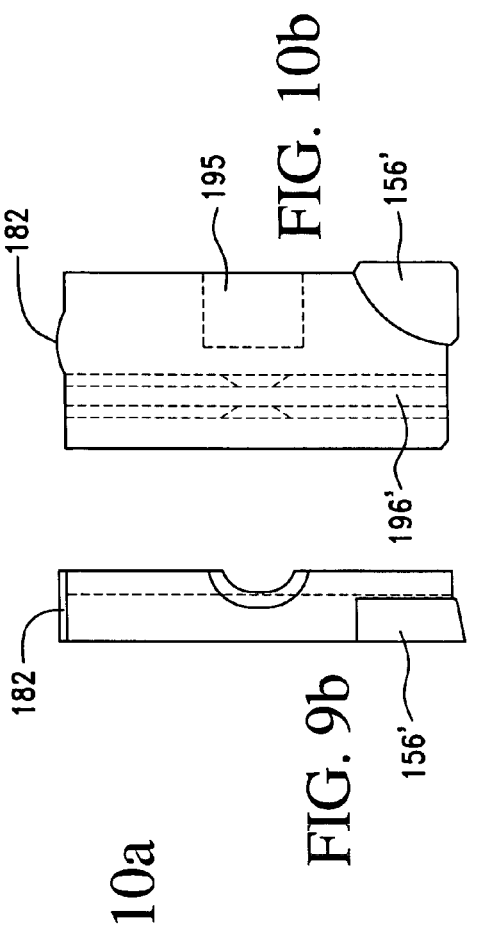
FIG. 9a
FIG. 10a
FIG. 9b
FIG. 10b

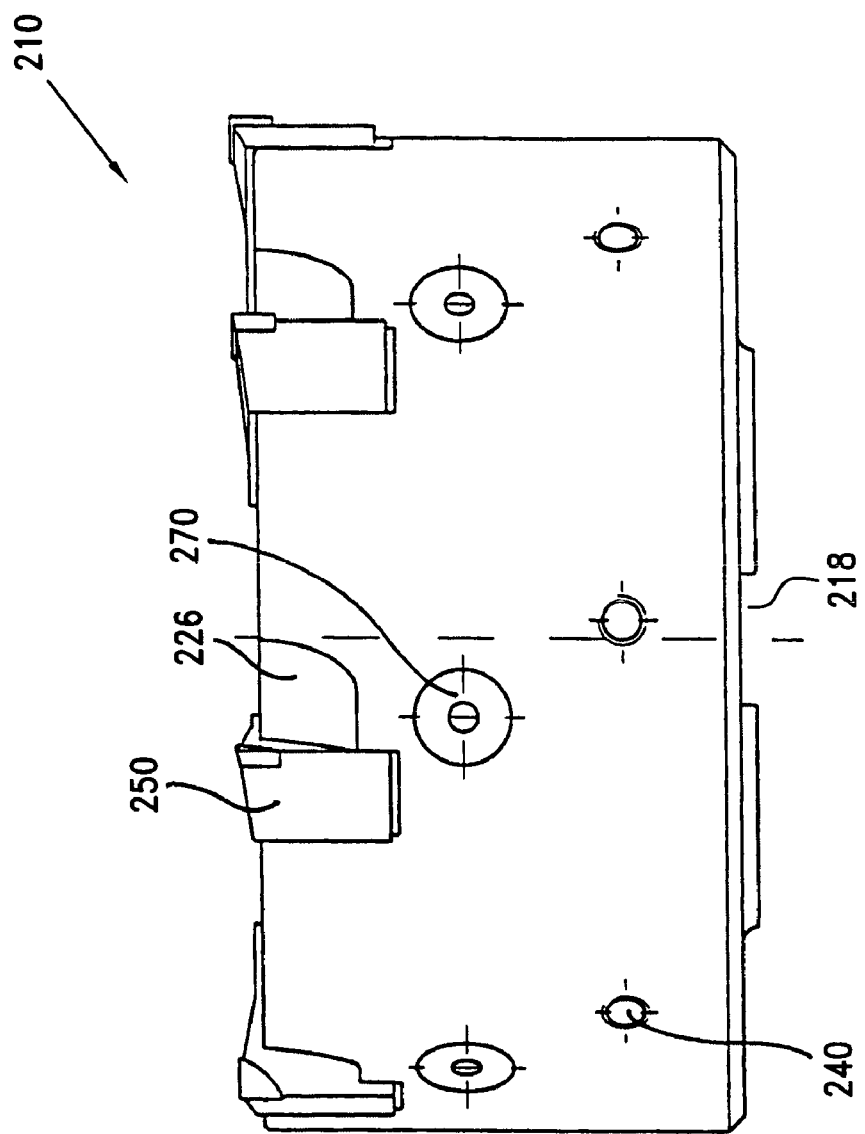

MILLING HEAD WITH ONE TO THREE-DIMENSIONAL ADJUSTABLE CUTTING INSERT AND WITH A POSITIVE FITTING CUTTING INSERT

BACKGROUND OF THE INVENTION

The invention relates to a milling head having a basic body and at least one cutting insert which is clamped in the basic body by means of a clamping element and whose position can be adjusted, wherein the cutting insert extends in a recess of the basic body and adjusting means which are in engagement are provided for the purpose of adjusting the cutting insert. Furthermore, the invention relates to a milling head having a basic body and cutting inserts which can be adjusted in the basic body in each case in recesses and are clamped by means of a clamping element which is disposed in a recess, wherein the cutting insert is positioned in a positive-fitting manner in a receiving part and is fixed in its position by means of the clamping element.

Milling heads of this kind are used in particular for milling at high rotational speeds and are subjected to correspondingly high stresses. In particular, it is important that the cutting inserts maintain their position, in order on the one hand to maintain the processing accuracy and on the other hand to obviate any risk of accidents occurring.

In the case of a milling head which is disclosed in DE 40 03 862 C2, the cutting inserts are disposed in recesses of the basic body and can be adjusted in an axial and radial direction. It is possible to clamp the cutting inserts with the aid of round wedges. The basic body comprises a cooling arrangement [not illustrated]. The axis of the round wedges is disposed in each case skewed with respect to the axis of the cutting inserts, wherein the round wedges are themselves disposed in turn in recesses of the basic body. The arrangement is such that the recesses of the cutting insert and the basic body are connected to each other and the cutting inserts are clamped by virtue of the round wedges against a wall region of the basic body and are held in this manner in the recess. The round wedge is provided in each case with a planar clamping surface in order to achieve an effective clamping contact.

In the case of a different milling head in accordance with DE 35 30 745 A1, the basic body comprises a plurality of grooves which are disposed substantially in a radial direction, issue into an outer peripheral region and into an end face region and in which in each case a cutting insert is disposed which can be adjusted in an axial and radial direction by means of adjusting devices. Since the grooves issue into both the end face region and into the outer peripheral region of the basic body, it is possible to use cutting inserts having various dimensions. In order to fix the cutting insert to the basic body, a clamping device is provided in the form of a clamping screw.

A common aspect of these and other milling heads is that the cutting inserts can be adjusted radially and axially. This is adequate for a number of applications. However, it is often required to adjust the cutting insert(s) to a greater extent, i.e. three-dimensional adjustability.

Another common aspect of these and other milling heads is the presence of an open recess, in which the cutting inserts are located and clamped by means of clamping elements. This peripheral recess or milled-out section serves to produce a smaller core diameter of the basic body as a variable which determines stability. Furthermore, as mentioned it is not possible to exclude the slight probability that the cutting inserts and clamping elements located in the open recess can become detached at the high rotational speeds employed and thus cause accidents.

U.S. Pat. No. 2,846,757 A describes a milling head having a basic body and at least one cutting insert which can be clamped in the basic body by means of a clamping element and its position can be adjusted. The cutting insert extends in a recess of the basic body and adjusting means which are in engagement are provided for the purpose of adjusting the cutting insert, wherein the cutting insert comprises a pivot mounting for adjustment purposes and on both sides of the pivot two adjusting screws are provided in the cutting insert for the purpose of fixing the pivot movement of the cutting insert. However, this pivot mounting is secured in the basic body and is thus fixed. It permits a tilting movement but not a longitudinal adjustment of the cutting insert.

Furthermore, DE 44 30 197 A discloses a tool for fine-machining the inner surfaces of bores. The basic body of this fine-machining tool is provided with a slot, of which the width can be varied by means of an adjusting device for the purpose of adjusting the diameter of the cutter.

In the case of a milling head in accordance with U.S. Pat. No. 4,964,763 A having a basic body and a cutting insert which can be adjusted in the basic body in a recess and is clamped by means of a clamping element which is disposed in a recess, the cutting insert is positioned in a positive-fitting manner in a receiving part and is fixed in its position by means of the clamping element. The clamping element is provided in the form of a wedge pin and a threaded pin. This can impair the operational reliability owing to possible torsional stresses and the tendancy of the cutting plate to vibrate.

DE 296 06 165 U describes a bevel milling apparatus whose cutting tools can be pivoted by being mounted in a centred manner on a holding body which can be rotated about an axis.

It is the object of the invention to provide a milling head which renders it possible for the cutting inserts to be used at high rotational speeds and to be adjusted in an extremely precise manner.

This object is achieved in accordance with the invention in the case of a milling head having the features of claim 1. Advantageous embodiments of the milling head in accordance with the invention are the subject matter of the subordinate claims.

SUMMARY OF THE INVENTION

A milling head in accordance with the invention thus comprises a basic body and at least one cutting insert which is clamped in the basic body by means of a clamping element and whose position can be adjusted. The cutting insert extends in a recess of the basic body. In order to adjust the cutting insert, adjusting means are provided which engage with said cutting insert. The cutting insert is mounted in a pivotal manner for adjustment purposes, wherein on both sides of the pivot two adjusting screws are provided in the cutting insert for the purpose of fixing the pivot movement of the cutting insert. The cutting insert is mounted on an adjusting part, wherein the cutting insert or the adjusting part comprise a protruding curvature for the purpose of forming the pivot, and the cutting insert comprises two adjusting screws in engagement with the adjusting part.

The ability to adjust the cutting inserts by pivoting them renders it possible to position the cutting inserts in an extremely precise manner. This adjustment can be performed as a third adjusting dimension in addition to the conventional adjustment in the axial and radial direction and therefore the cutting insert can be adjusted with the greatest degree of accuracy. The adjusting screws which are disposed on both sides of the pivot defined by the curvature serve to provide a reliable-two point adjustment or pivot movement of the cutting insert which, however, produces a maximum stroke of 1 mm, thus representing a fine-adjustment.

In an advantageous manner, it is also possible to provide for the clamping elements a receiving part, in which the clamping elements are each disposed in a displaceable manner. In this manner, the clamping elements are also reliably held in the basic body and essentially it is only the clamping forces which act against the cutting inserts. The clamping elements can be received in a positive-fitting manner in their receiving parts.

In the case of a preferred exemplified embodiment of the invention incorporating particularly effective adjusting characteristics, the cutting insert comprises a rotatable cutting plate carrier which supports the cutter.

In an advantageous manner, the cutting insert can be provided with an inclination on the side engaging with the clamping element. This produces a large contact surface.

Preferably, the clamping element is also provided with an inclination on the side engaging with the cutting insert. This inclination serves to wedge the cutting insert and the clamping element in such a manner that by reason of this type of positive-fitting connection the clamping element is no longer able to be detached. Therefore, this locking effect can reliably prevent any parts from being detached.

In the case of one embodiment of the milling head in accordance with the invention, a shaped member is provided as an adjusting means for the cutting insert and is in forced form engagement with a complementary recess of the cutting insert such that any movement of the adjusting means causes the cutting insert to move in the same direction. This embodiment provides a continuous movement of the cutting insert of the cutting blade in both directions. This adjustment is performed without any clearance and can be achieved in a defined diameter range. The shape of the recess, for example a groove which extends in the longitudinal direction of the cutting insert, means that it is possible to make adaptions to suit the shape of the head of the adjusting means. A ball, ellipse, rectangle, trapezium and many others are examples of possible shapes which can be used for this purpose. It is merely necessary to guarantee a reliable actuating engagement.

In the case of one advantageous exemplified embodiment of the milling head in accordance with the invention, a retainer wedge which extends in a radial direction and is attached in the basic body is in engagement with the rear end of the cutting insert in relation to the front side of the milling head, and moreover is preferably in engagement with a projection provided on the cutting insert. This retainer wedge has the task of protecting the cutting insert from the absorption of axial forces and thus from being displaced. In order to guarantee effective rotation, the projection is designed with a curved contour.

Furthermore, it is possible for the basic body to be provided with a recess for engagement with the end of the cutting insert at the rear in relation to the milling head tip and having a shape, the contour of which corresponds to the shape of the end of the cutting insert. This positive-fit causes the contours of the cutting insert and the basic body to abut against each other and this renders it possible to absorb the axial cutting pressures in a reliable and stable manner.

In the case of the milling head in accordance with the invention, an adjusting wedge which is mounted with a positive fitting can be provided as the adjusting means for the cutting insert in the radial and/or axial direction.

Furthermore, an adjusting screw can be provided as the adjusting means for the cutting insert in the radial and/or axial direction.

In an expedient manner, the adjusting screw is a differential screw which is in threaded engagement with the cutting insert. One advantage of the embodiment of the adjusting member as a differential screw is achieved by virtue of the fact that it provides a space-saving design, because unlike conventional adjusting screws a through-going bore is not required in the basic body of the milling head. On the contrary, the differential screw can be adjusted from the cutting side. This provides more space for the cutter and further parts of the milling head. Moreover, the arrangement is extremely compact.

In the case of a preferred exemplified embodiment, a clamping wedge or angle piece or a claw is provided for the clamp-attachment of the cutting insert. Furthermore, it can be attached for example by using a normal clamping screw or even a differential screw.

In an advantageous manner, the cutting insert can be a cartridge, which extends in the longitudinal direction of the cutting insert, in block form having a thread/complementary recess for engagement with the adjusting means. The cartridge is conventionally made from steel and the cutting blade can be connected to the cartridge by means of a solder connection or positive-fit.

The cutting insert can comprise a cutter, which is soldered on to a carrier, a cutter which is mounted with a positive fit or even a turning plate which is screwed to a carrier. Suitable materials for the cutter and/or turning plate include hard metal, cermet, ceramic, CBN, polycrystalline, natural and synthetic diamond as a thin and thick film.

In an expedient manner, cooling agent is supplied in the basic body and/or to the cutting insert.

In particular, one embodiment of the milling head in accordance with claim 18 permits usage at high rotational speeds. This milling head thus comprises a basic body and cutting inserts which can be adjusted in the basic body in each case in recesses and can be clamped by means of a clamping element which is disposed in a recess. The cutting insert is positioned in a positive-fitting manner in a receiving part and is fixed in position by means of the clamping element. The clamping element is clamping wedge which is received in a positive-fitting manner in its receiving part.

In accordance with the invention, the provision of a receiving part having a positive fit renders it possible to hold the respective cutting insert not only over a part of the peripheral surface but rather essentially completely in the basic body, so that it is not necessary to provide on the periphery of the basic body a larger open region for the recesses of cutting inserts and clamping elements. In this manner, the basic body is not weakened, on the contrary its entire diameter contributes to the stability of the milling head. This is extremely important in view of the rapidly rotating parts at high rotational speeds. Moreover, receiving the cutting inserts in a positive-fitting manner provides an extremely secure seating for the cutting inserts which is no longer determined almost exclusively by means of the clamp-attachment. The clamping elements serve merely to fix the position of the cutting inserts, but no longer serve to hold them completely.

In order to adjust the cutting inserts in a radial manner, it is possible in each case to provide an eccentric bushing which is mounted in a positive-fitting manner and in which the relevant cutting insert is positioned. That is to say that the central axis of the outer diameter of the bushing is different to that of the inner diameter, wherein the difference in the mismatch produces the adjusting path. Any rotation of the eccentric bushing results therefore in the cutting insert being displaced in a radial manner inwards or outwards. The clamping element fixes the position of the cutting insert.

Alternatively, the cutting inserts can be adjusted by means of a wedge or screw.

In accordance with the invention, a receiving part is likewise provided advantageously for the clamping elements and the clamping elements are each disposed therein in a displaceable manner. In this manner, the clamping elements are also securely held in the basic body and essentially only the clamping forces act upon the cutting inserts. The clamping elements can also be received in a positive-fitting manner in their receiving parts.

In the case of one preferred exemplified embodiment of the invention, the receiving part for the clamping element is disposed in such a manner that it crosses the receiving part of the cutting insert. On the one hand, this reduces the weakening of the basic body to the slightest possible extent by virtue of the fact that the associated receiving spaces together merely form one small common recess or groove in the basic body, i.e. a minimal hollow space therein. On the other hand, this type of design ensures that the engagement directions of the clamping forces and assembly forces are effective substantially at a large angle with respect to the adjusting forces for the cutting inserts in the basic body. Furthermore, it is also readily possible to provide a parallel- or quasi-parallel-extending receiving part for the clamping element, wherein only a small lead-through region for the clamping engagement forms a connection between these two receiving parts.

In an advantageous manner, the cutting insert is provided with an inclination on the side engaging with the clamping element. This serves to provide a large contact surface. An inclination angle of about 10° has proven to be expedient. However, it is also possible to select other angles.

Preferably, the clamping element is also provided with an inclination on the side engaging with the cutting insert, which inclination expediently has a smaller angle than the inclination angle of the cutting insert. In accordance with one exemplified embodiment of the invention, the difference in the inclination angles is about 2°. This alternate inclination serves to wedge the cutting insert and the clamping element in such a manner that owing to this kind of positive-fitting connection the clamping element can no longer be detached. Therefore, this locking effect can reliably prevent any parts from becoming detached.

The feature of providing the cutting insert and/or the clamping element with an inclination should also comprise the embodiment having an eccentric bushing. This means that in this case the eccentric bushing encompassing the cutting insert can be provided with an inclination and the clamping element can be in engagement with the eccentric bushing.

Alternatively, the basic body can be provided with a receiving bore at an angle with respect to the rotational axis, in which an adjusting bushing for the cutting insert is positioned. Adjusting the adjusting bushing by means of an associated screw then causes the cutting insert to be adjusted radially inwards or outwards corresponding to the adjusting direction.

In the case of one advantageous development of this exemplified embodiment, the cutting insert is mounted in a two-part adjusting bushing. The separation cut through this adjusting bushing is inclined and parallel with the rotational axis and for this reason this design of the adjusting bushing is also described in this case as a conical bushing. If then a part of the conical bushing is displaced by virtue of a screw engaging therewith, then for example the gap between the two parts can increase in size and consequently the other part can likewise be displaced in the same direction, which then serves to increase the diameter. In the opposite direction, the cutting insert is adjusted inwardly.

In order to adjust the cutting insert, it is possible for example to provide a differential screw, wherein the cutting insert can comprise a cutter, which is soldered on to the carrier, or also a turning plate which is screwed to a carrier. Other designs are possible. In an expedient manner the cutter and/or turning plate consists of hard metal, cermet, ceramic, CBN, polycrystalline, natural and synthetic diamond as a thin and thick film.

One expedient embodiment of the cutting insert can be L-shaped, wherein the cutter is located in the front region of the short limb, whereas the inclination is located on the long limb.

In order to attain a further adjusting dimension of the cutting inserts in addition to the axial and radial direction, the cutting insert can comprise a rotatable cutting plate carrier which supports the cutter. By virtue of adjusting screws which are expediently disposed on both sides of the pivot, it is possible to achieve a reliable two-point adjustment or pivot movement of the cutting part.

In the case of one advantageous exemplified embodiment of a cutting insert, it supports a movable cutting plate, against which is located a pin body impinging at an angle and with its one end in position. The pin body exerts pressure outwardly against the cutting plate and lies with its other end against the inclined surface of an adjusting element. Expediently, the pin body is a pin. It can also be a screw or a screw having a movable bearing plate. A conical screw can be used as the adjusting element and automatically contains an annular arrangement and produces in a convenient manner the prestressing force, with which the pin body lies against the cutting plate. This type of cutting insert design renders it possible to perform fine adjustments in the range up to about 6/100 mm.

A cooling arrangement is expediently provided in the basic body.

BRIEF DESCRIPTION OF THE DRAWINGS

The invention will be further described hereinunder with reference to exemplified embodiments and the drawing. This illustration merely serves to explain the invention and, as with the summary of the features of the subordinate claims, should not be used individually for the purpose of limiting the invention. In the drawing, FIG. 1 shows a lateral partial sectional view of a basic body of a milling head according to a first exemplified embodiment of the invention having cutting inserts which can be adjusted by being pivoted and of which one is illustrated, FIG. 2 shows a plan view of the basic body of FIG. 1, partially in cross-section, FIG. 5 shows a lateral view of a milling head having a receiving part, FIG. 8 shows an enlarged illustration of a lateral partial sectional view similar to FIG. 6 of a basic body of a milling head according to a fourth exemplified embodiment of the invention having cutting inserts which can be adjusted by being pivoted and of which one is illustrated, FIG. 9 shows a view of a cutting insert of the fourth exemplified embodiment similar to FIG. 5, FIG. 10 shows a lateral view of the cutting insert of FIG. 8, FIG. 20 shows a lateral view of the milling head of FIG. 14 after the assembly process.

DETAILED DESCRIPTION OF THE INVENTION

Figure 4:
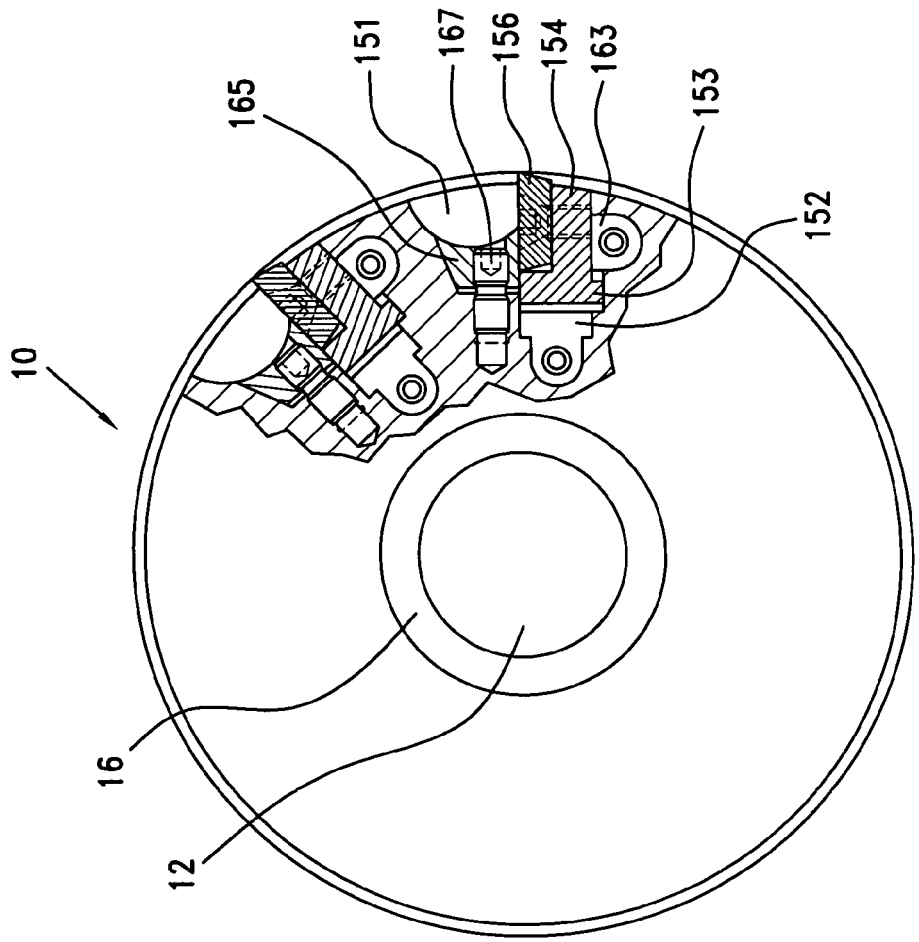
FIG. 4 shows a plan view of the basic body of FIG. 3, partially in cross-section.
Figure 3B:
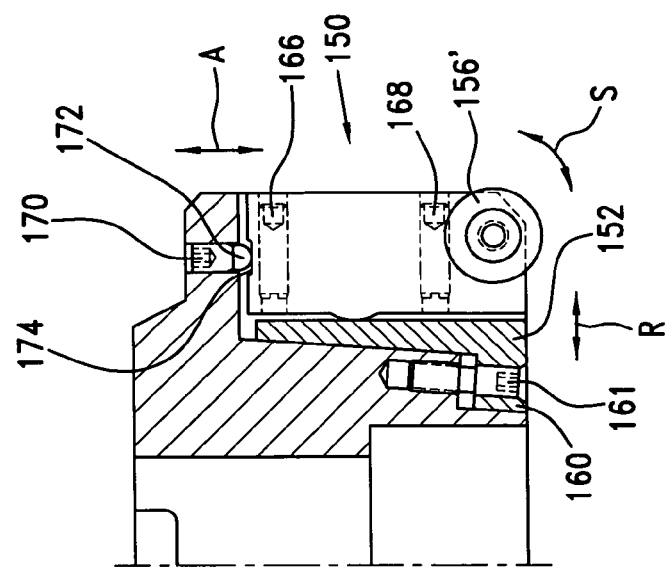
FIG. 3 shows a lateral partial sectional view of a basic body of a milling head according to a second exemplified embodiment of the invention having cutting inserts which can be adjusted by being pivoted and of which one is illustrated.

A first exemplified embodiment of a milling head according to the invention is initially described with reference to FIGS. 1 and 2. A basic body 10 consisting, for example, of steel and aluminium comprises a central bore 12 and a screw receiving part 16 for an attachment screw. A through-going bore [not illustrated] serves to receive a clamping tool.

Distributed in a uniform manner over the periphery of the basic body 10 and located therein are cutting inserts 150 which are received in a positive-fitting manner in receiving parts. The receiving parts are adjoined by clamping grooves 151. The cutting inserts 150 consist of a wedge-shaped adjusting part 152 and a cutting part 154 supporting the cutter. The cutter is a screwed-on turning plate 156 in the illustrated exemplified embodiment. The adjusting part 152 comprises a bearing edge 158, which extends in an inclined manner in relation to the basic body axis, towards the basic body 10, from which bearing edge an adjusting projection 160 having an adjusting screw 161 extends in a radial manner inwards. In the axial direction, a gap 162 is left between the adjusting part 152 and the basic body 10. The cutting insert 150 can be adjusted in the radial and axial direction by adjusting the adjusting part 152 in an axial manner in parallel with the bearing edge 158 thereof. A clamping wedge 163 which is used as a retainer wedge is provided for the purpose of guaranteeing radial clamping, i.e. to clamp the cutting part 154 with the adjusting part 152, i.e. is in engagement with a projection 153 provided thereon. Furthermore, the cutting insert 150 can be clamped by a clamping wedge 165 having an adjusting screw 167 which is positioned in a receiving part 1650 which tapers from the clamping groove 151. Moreover, the cutting part 154 is rotatably mounted with respect to the adjusting part 152 by virtue of a protruding curvature for the purpose of forming a pivot 164. In order to pivot the cutting part 154, it comprises two adjusting screws 166, 168. As illustrated by the arrows R and S, the adjusting part 152, 160 renders it possible to perform a radial adjustment and the pivotal mounting 164, 166, 168 renders it possible to perform a pivotal adjustment.

A second exemplified embodiment of a milling head 10 according to the invention will now be described with reference to FIGS. 3a, 3b, 4 and 5. Where the parts are the same as in the exemplified embodiment explained above, they are designated by the same reference numerals and will not be described once more. This milling head also comprises an adjusting screw 170 which is disposed in an axial manner in the basic body 10 and renders it possible to adjust the cutting insert in the axial direction (arrow A). The front end 172 of the adjusting screw 170 is in engagement with a recess 174 in the cutting part 154. Moreover, the cutting insert 150 can be adjusted (arrow R) and pivoted (arrow S) in the radial direction. Whereas the turning plate 156 in the example of FIG. 3a has a rectangular cross-section as in the case of the first exemplified embodiment, this cross-section is round in the example of 3b. FIG. 5 shows in the form of a lateral view a complete illustration of a milling head M having a tool receiving part D.

A third exemplified embodiment of a milling head 10 according to the invention will now be described with reference to FIG. 6. Where the parts are the same as in the exemplified embodiment explained above, they will be designated by the same reference numerals and will not be described once more. Instead of having the adjusting screw 170 of the second exemplified embodiment, this milling head comprises an adjusting wedge 180 which is disposed in the basic body 10 radially in a positive-fitting manner in a receiving part and has an adjusting screw 181 which renders it possible to adjust the cutting insert in the axial direction (arrow A). The adjusting wedge 181 is in engagement with a small curvature 182 of the cutting insert 150. Radial adjustment of the adjusting wedge 180 causes the cutting insert 150 to be adjusted in an axial manner. Radial adjustment (arrow R) is made possible by way of adjusting means which will be explained in more detail hereinunder, wherein during the respective adjusting procedure the adjusting wedge 180' is then detached and then affixed once again. A screw 194 which is mounted in a receiving part 195 is also provided for the purpose of fixing the position.

Figure 7A:
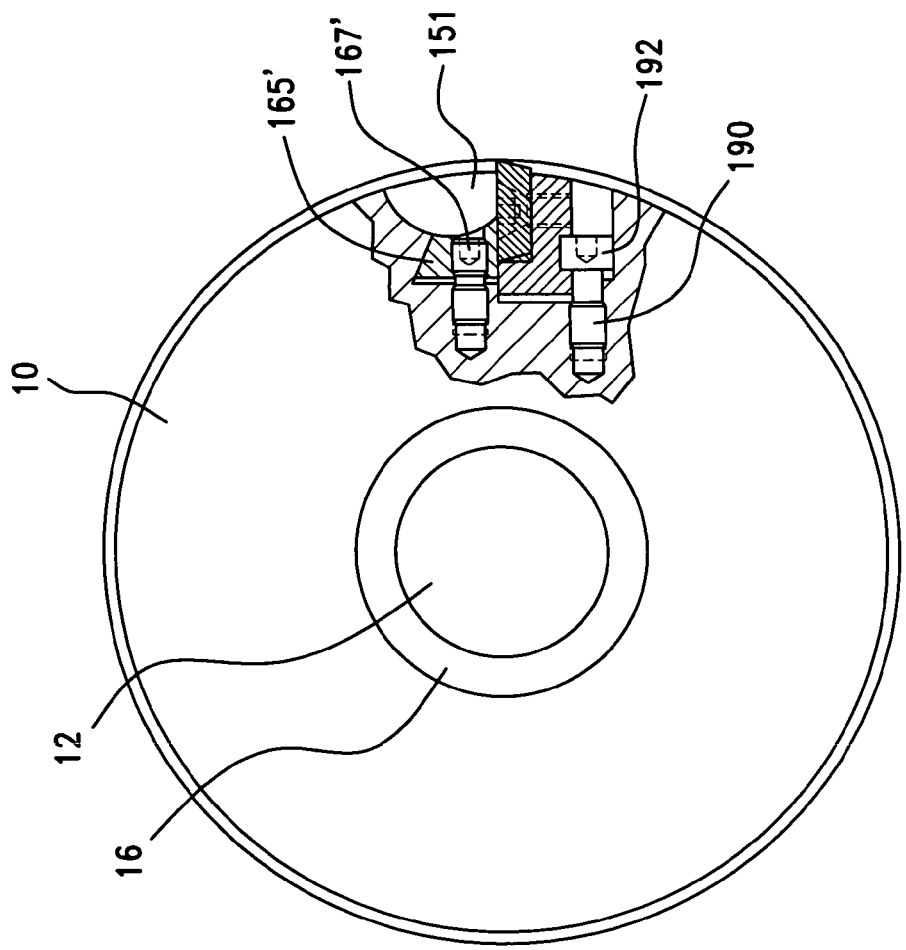
FIG. 7 shows a plan view of the basic body of FIG. 6.
Figure 6A:
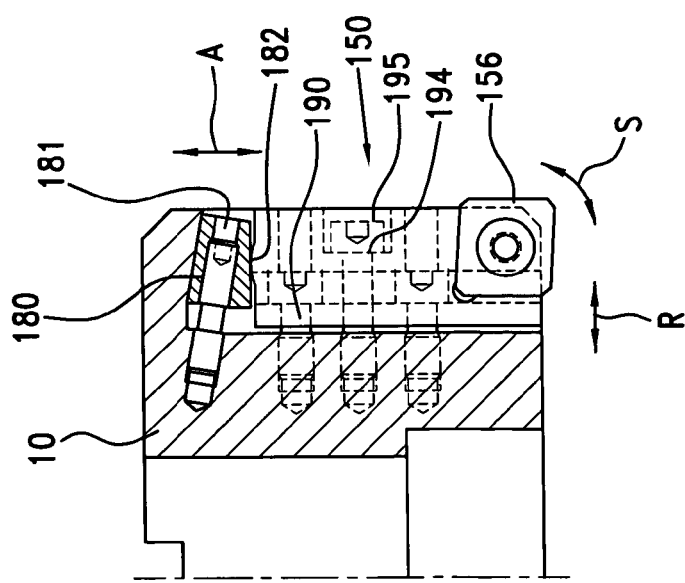
FIG. 6 shows a lateral partial sectional view of a basic body of a milling head according to a third exemplified embodiment of the invention having cutting inserts which can be adjusted by being pivoted and of which one is illustrated.
Figure 7B:
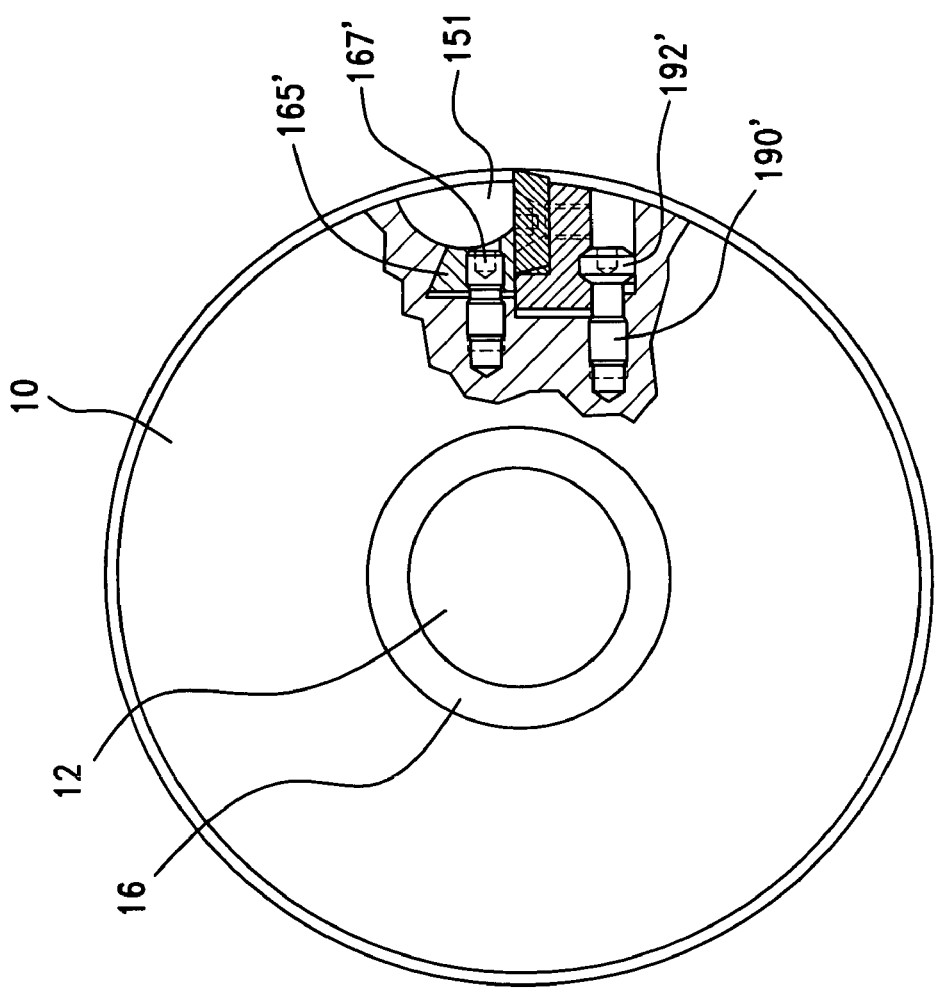
Figure 6B:
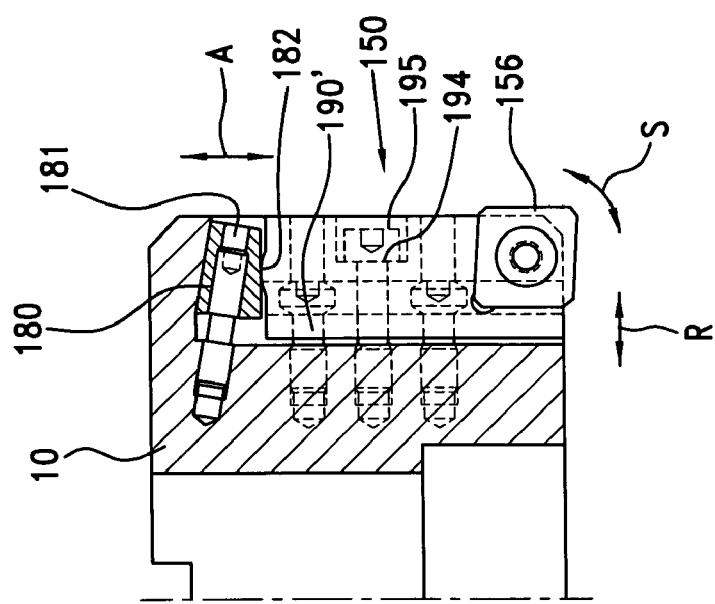

The third exemplified embodiment of the invention as illustrated in FIGS. 6 and 7 has threaded shaped members 190 as the adjusting means for the cutting insert 150 instead of an adjusting part 152 and adjusting projection 160 and the shaped part 192 of said shaped members is rectangular in the case of the example of FIGS. 6*a*, 7*a*. In the case of the alternative example of the shaped members 190' of FIGS. 6*b*, 7*b* the shaped part 192' is formed in a wedge-shaped manner. The shaped part 192 is in forced form engagement with a complementary recess 196 of the cutting insert 150. A movement of the shaped member 190 causes the cutting insert 150 to move in the radial direction. Furthermore, the cutting insert 150 can be pivoted (arrow S). Unlike the exemplified embodiments illustrated above, the clamping wedge 165' is formed in such a manner that it is positioned in a secure manner in a receiving part 1650' which tapers towards the clamping groove 151, which is extremely advantageous in particular for high-speed milling heads.

FIGS. 8, 9 and 10 show enlarged illustrations of a fourth exemplified embodiment of the invention, which differs from the third exemplified embodiment by virtue of the cutter which in this case is a cutter 156' which has been soldered on.

Figure 13:
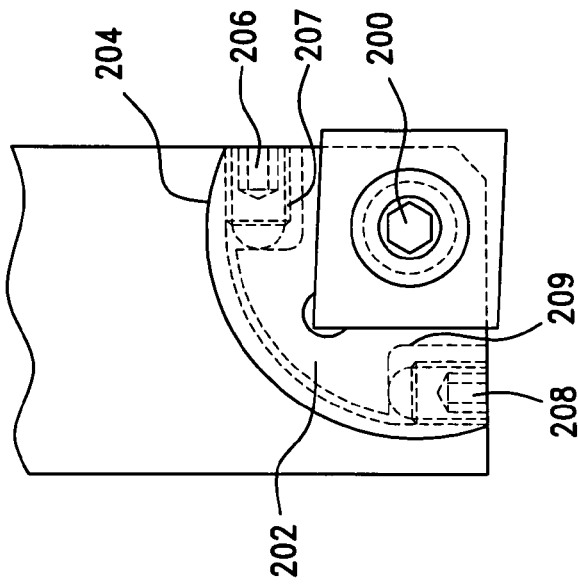
FIG. 13 shows an enlarged view of the cutting insert of FIG. 11.
Figure 12:
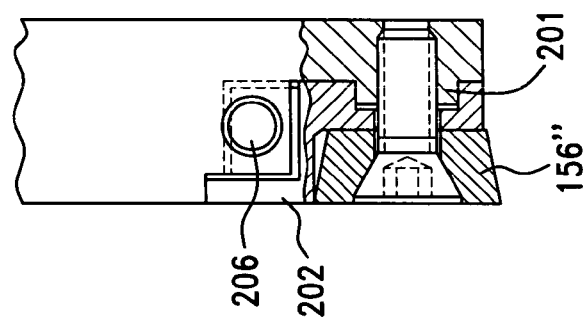
FIG. 12 shows a lateral partial sectional view of the cutting insert of FIG. 11.
Figure 11:
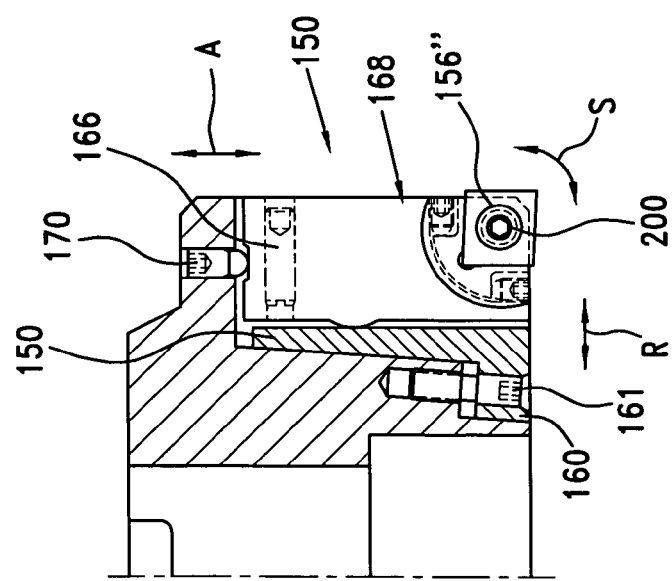
FIG. 11 shows a lateral partial sectional view of a basic body of a milling head according to a fifth exemplified embodiment of the invention having a rotatable cutting insert.
Figure 14:
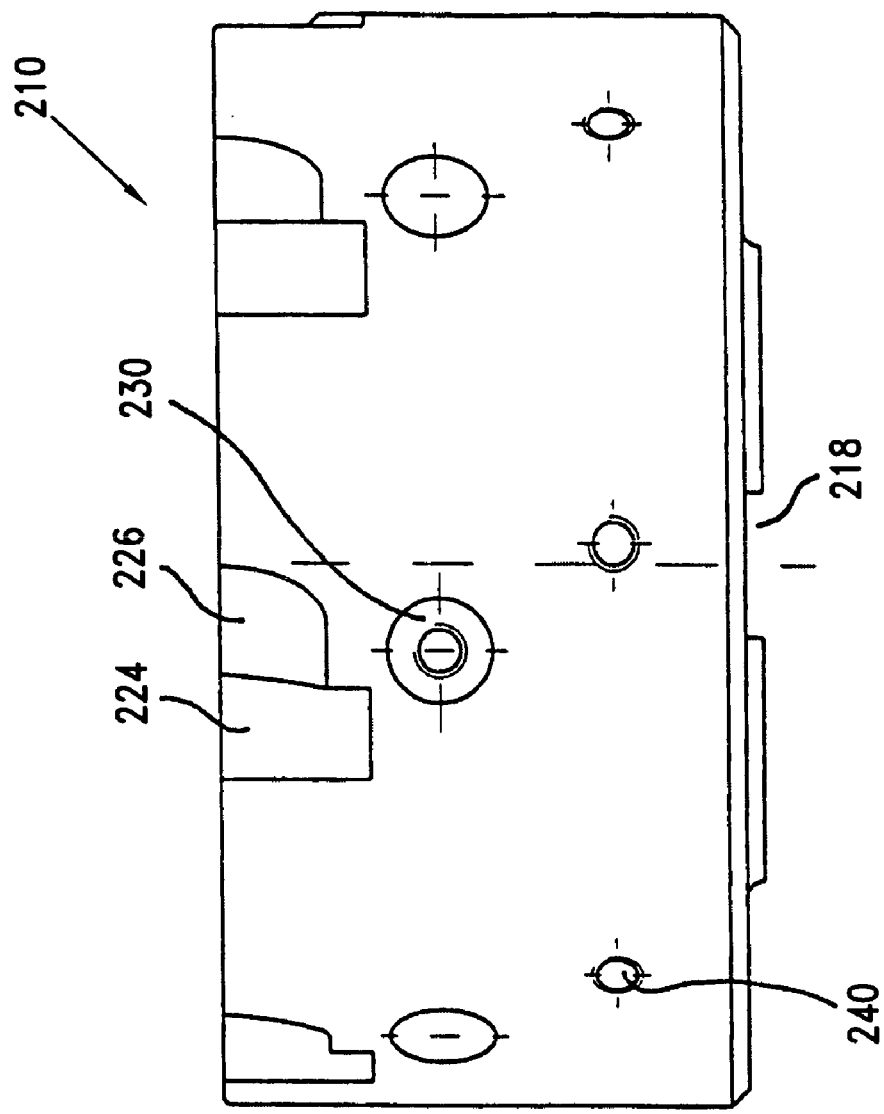
FIG. 14 shows a lateral view of a basic body of a milling head according to a sixth exemplified embodiment of the invention.
Figure 15:
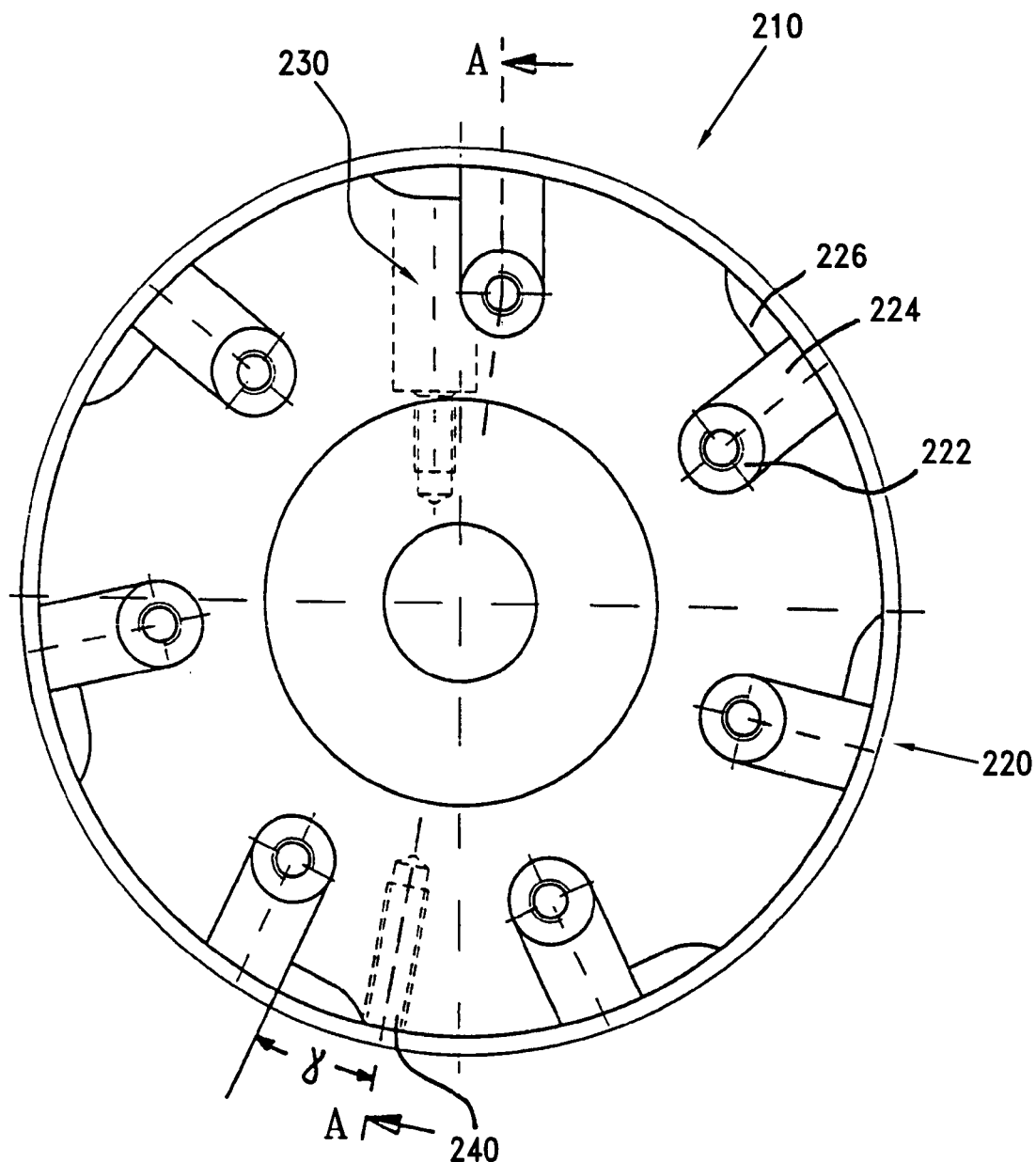
FIG. 15 shows a plan view of the basic body of FIG. 14.
Figure 16:
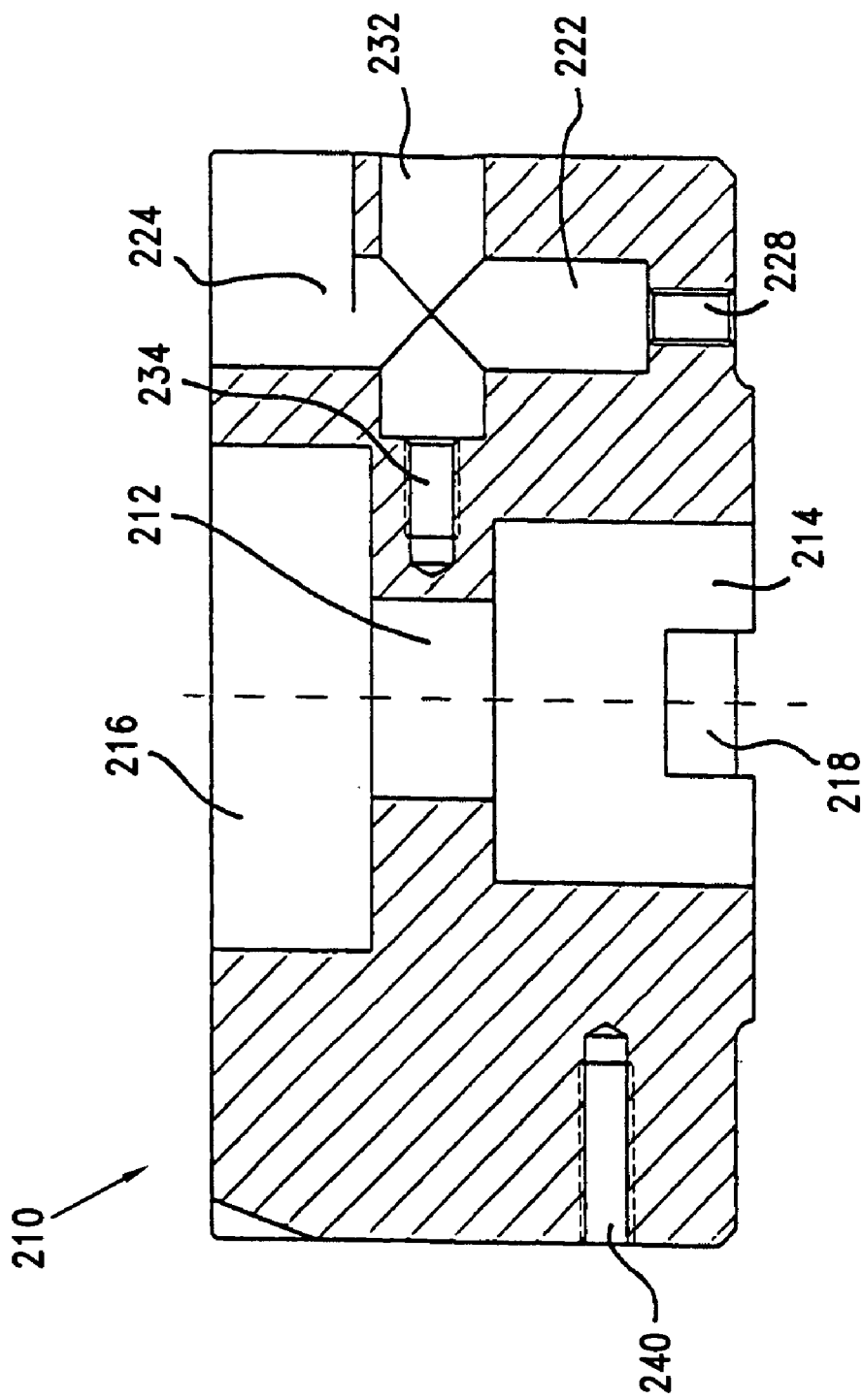
FIG. 16 shows a sectional view along line A—A in FIG. 15.
Figure 17:
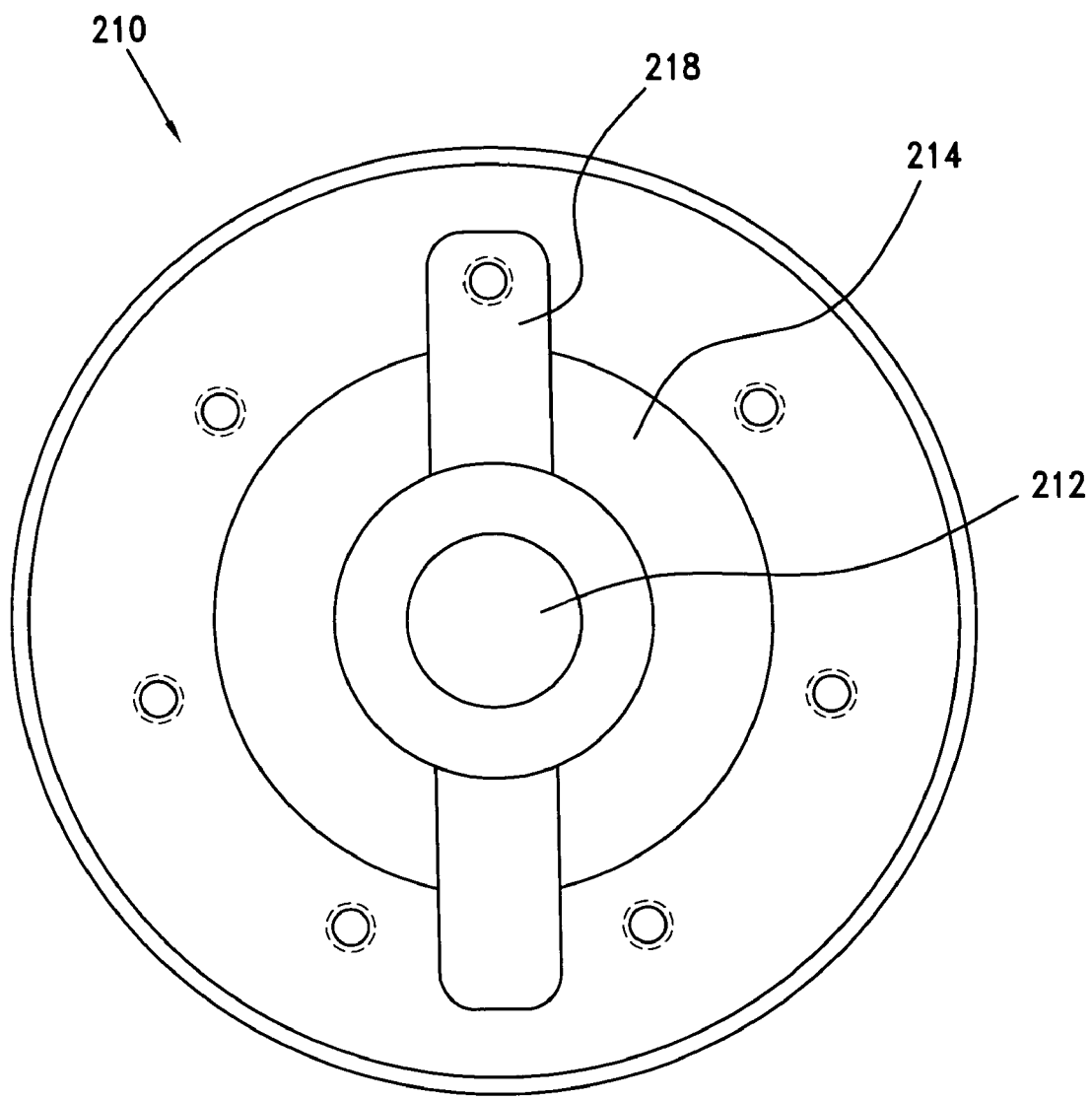
FIG. 17 shows a view from below of the basic body of FIG. 14, FIG. 18 show views (a) to (d) of a cutting insert from above (a), from the side, partially cut-away (b), from the side (c) and in cross-section (d)
Figure 18A:
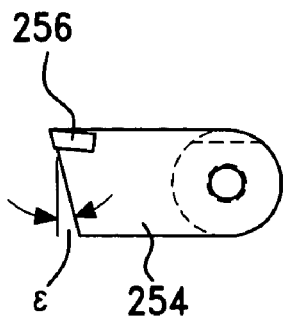
Figure 18B:
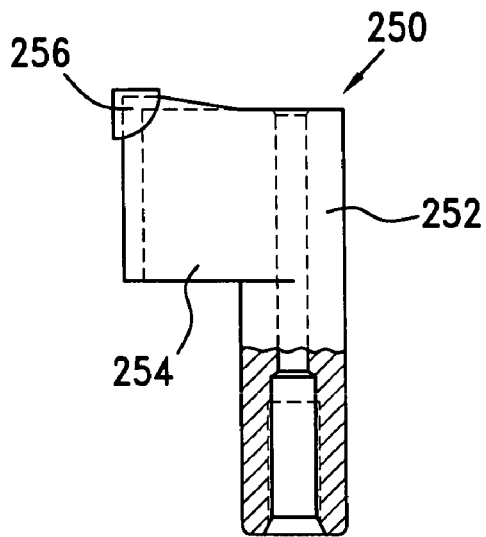
Figure 18C:
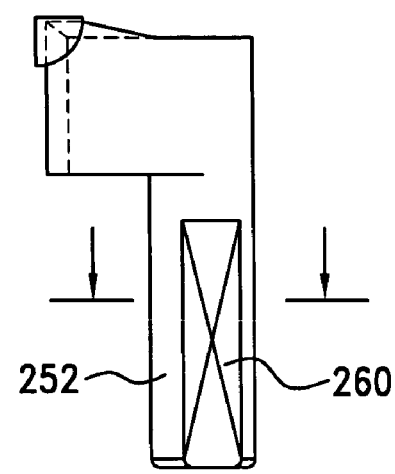
Figure 18D:
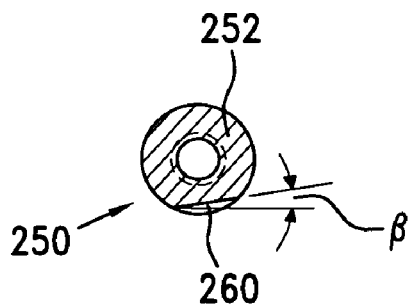

FIGS. 11 to 13 show a fifth exemplified embodiment of a milling head 10 according to the invention. Where the parts are the same as in the exemplified embodiments explained above, they are designated by the same reference numerals and will not be described once more. For the sake of clarity, only the adjusting screw 168 is indicated. In turn, a turning plate 156" is provided as the cutter.

The turning plate 156" is attached by means of a screw 200 in a turning plate carrier 202 which can be rotated about a pivot which coincides approximately with the screw 200. Accordingly, the basic body 10 is provided with a bearing surface 204 having a circle sector contour. The cutting part 154 comprises at the pivot a collar 201 which serves to fix the cutting part in a positive-fitting manner. The carrier 202 can be adjusted by two adjusting screws 206, 208 on opposite ends. As illustrated, the adjusting screws 206, 208 can be positioned in adjusting receiving parts 207, 209 in the carrier 202. Alternatively, said adjusting screws can be disposed in engagement with adjusting projections on the cutting insert. Furthermore, it is possible to provide a guide [not illustrated] for the rotational movement.

A basic body for a milling head according to a sixth exemplified embodiment of the invention will now be described with reference to FIGS. 14 to 18. This type of basic body 210 comprises a central bore 212, a receiving recess 214 and a screw receiving part 216 for an attachment screw. A through-going bore, in this case a recess 218 serves to receive a clamping tool.

The basic body 210 consisting for example of steel and aluminium comprises ten receiving parts 220, which are distributed uniformly over the periphery thereof, for cutting inserts which are described hereinunder and which consist essentially of a receiving bore 222, which is coaxial to the axis of the basic body 210, and a recess 224 which extends in a radial manner outwards in the end-face region of the basic body 210. The recesses 224 are adjoined by chip [sic] space recesses 226. The receiving bores 222 do not extend quite as far as the underside of the basic body 210 but adjusting element bores 228 adjoin its lower end in each case.

Furthermore, the basic body 210 comprises clamping wedge bores 230 which cross the receiving bores 222 and extend from the periphery in a radial manner inwards and consist of a bore 232, which crosses the receiving bore 222, and of a bore 234 adjoining thereto and having a smaller diameter and internal thread for an adjusting screw. The position of the clamping wedge bore 230 on the periphery at an angle with respect to the position of the coaxial receiving bore 220 is somewhat offset, so that the clamping wedge bore 230 is located with a slight overlap but, however, mainly at a spaced interval below the chip [sic] space 226.

Furthermore, ten threaded bores 240 for receiving balancing screws are provided in an axial manner at a spaced interval and below the clamping wedge bores 230. The balancing screws are disposed approximately below the region of the chip [sic] spaces at the front in the direction of rotation, i.e. offset by an angle γ of 10° in relation to the peripheral recesses 224 of the cutting insert receiving parts 220.

FIG. 18 illustrates an exemplified embodiment of a cutting insert 250 consisting, for example, of steel for a milling head in accordance with the invention. The cutting insert is L-shaped and has a long limb or shaft 252 and a short limb 254. In the illustrated exemplified embodiment, the cutting insert 250 consists of a carrier with a soldered cutter 256. The end face of the cutting insert associated with the short limb 254 is inclined at an angle δ of 5° in relation to the perpendicular with respect to the longitudinal axis. In the illustrated exemplified embodiment, the inclination angle ϵ of the end face of the short limb 254 amounts to 15°. A threaded bore 258 which serves to receive a differential screw for the axial adjustment of the cutting insert 250 extends through the long limb or shaft 252 from the end face thereof. The cutting insert 250 comprises on its outer periphery a planar inclination 260 over a large part of the length of its shaft 252 such that this inclination comprises an angle β of about 10° in relation to the peripheral tangential, as most clearly illustrated in FIG. 18(*e*). This inclination 260 is used for engagement with the described clamping wedge.

Figure 19A:
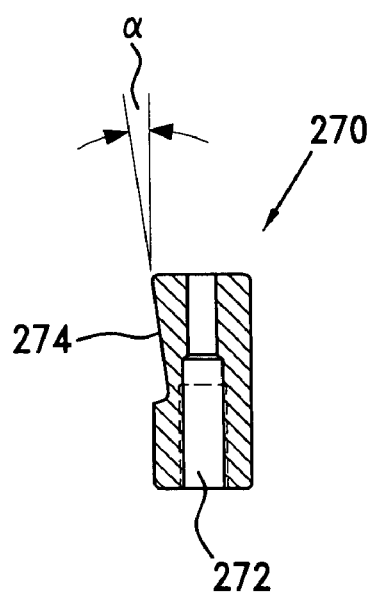
FIG. 19 shows (a) a lateral view and (b) a front view of a clamping wedge.
Figure 19B:
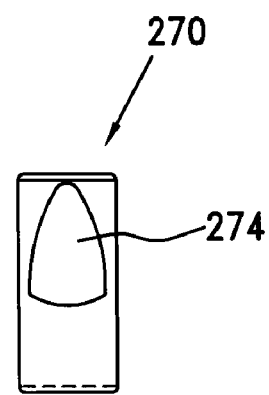

FIG. 19 illustrates a clamping wedge 270 which comprises a threaded bore 272. On one side (left-hand side in FIG. 19) the clamping wedge 270 has an inclination 274 which extends at an angle α of about 8° in relation to the axis of the clamping wedge 270. The inclination 274 of the clamping wedge 270 is provided for engagement with the inclination 260 of an associated cutting insert 250.

Figure 23:
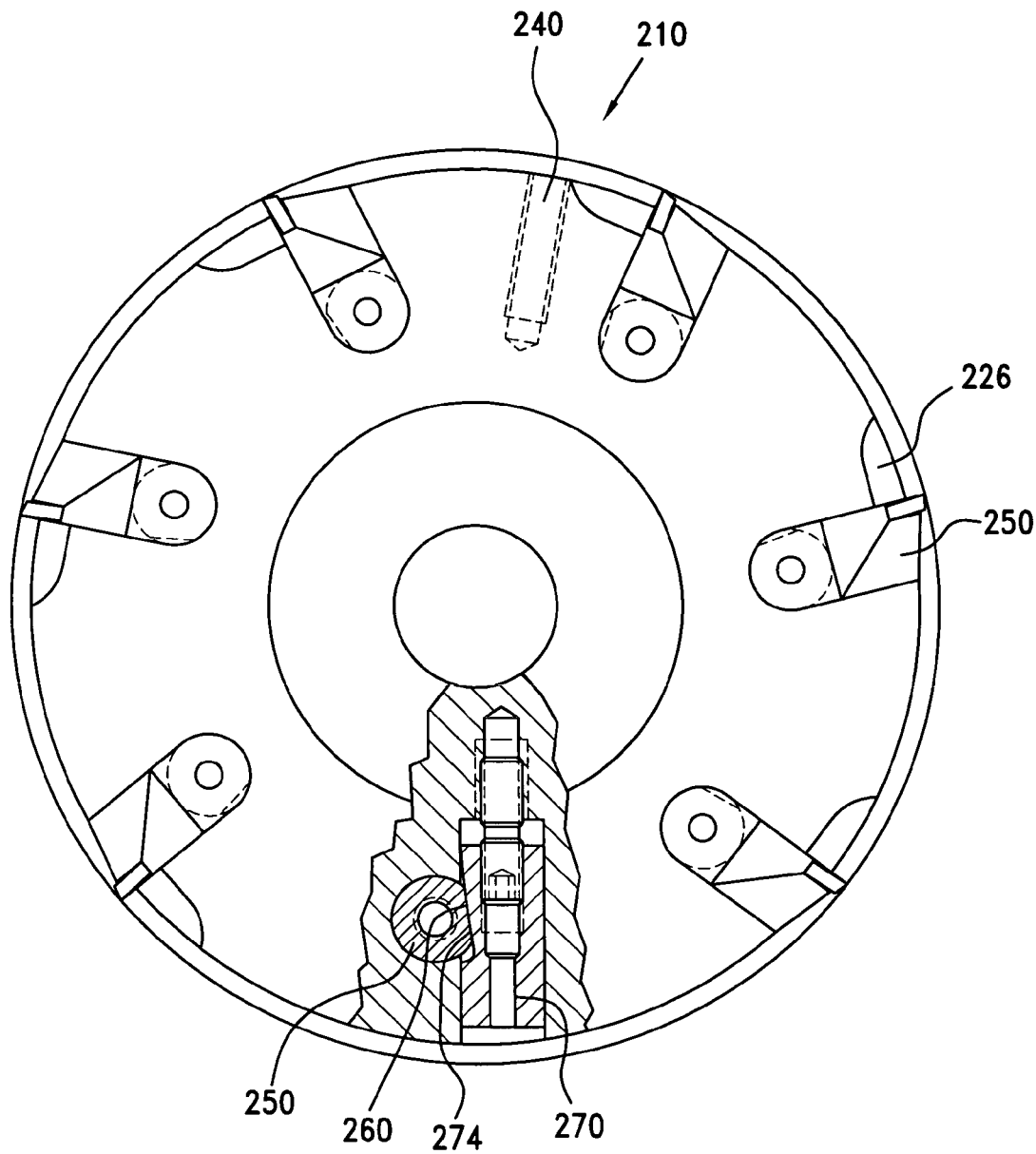
FIG. 23 shows a plan view similar to FIG. 21 showing in a cut-away partial sectional view the clamping engagement of the cutting insert and clamping wedge.

The relative position of the inclinations 260 and 274 of the cutting insert 250 and clamping wedge 270 is illustrated in FIG. 23 by the cut-away partial sectional view. As shown in this view, the different chamfers of the inclinations 260 and 274 produce a self-locking wedging effect. The clamping wedge 270 is used at first followed by the cutting insert 250. During use, the cutting insert is rotated in the direction of the receiving wall, wherein said cutting insert becomes increasingly fixed owing to this angular difference of 2°. However, it is not possible during the cutting operation for parts to become detached because conversely the clamping effect continues to increase by reason of the thread directions and insertion directions.

Figure 21:
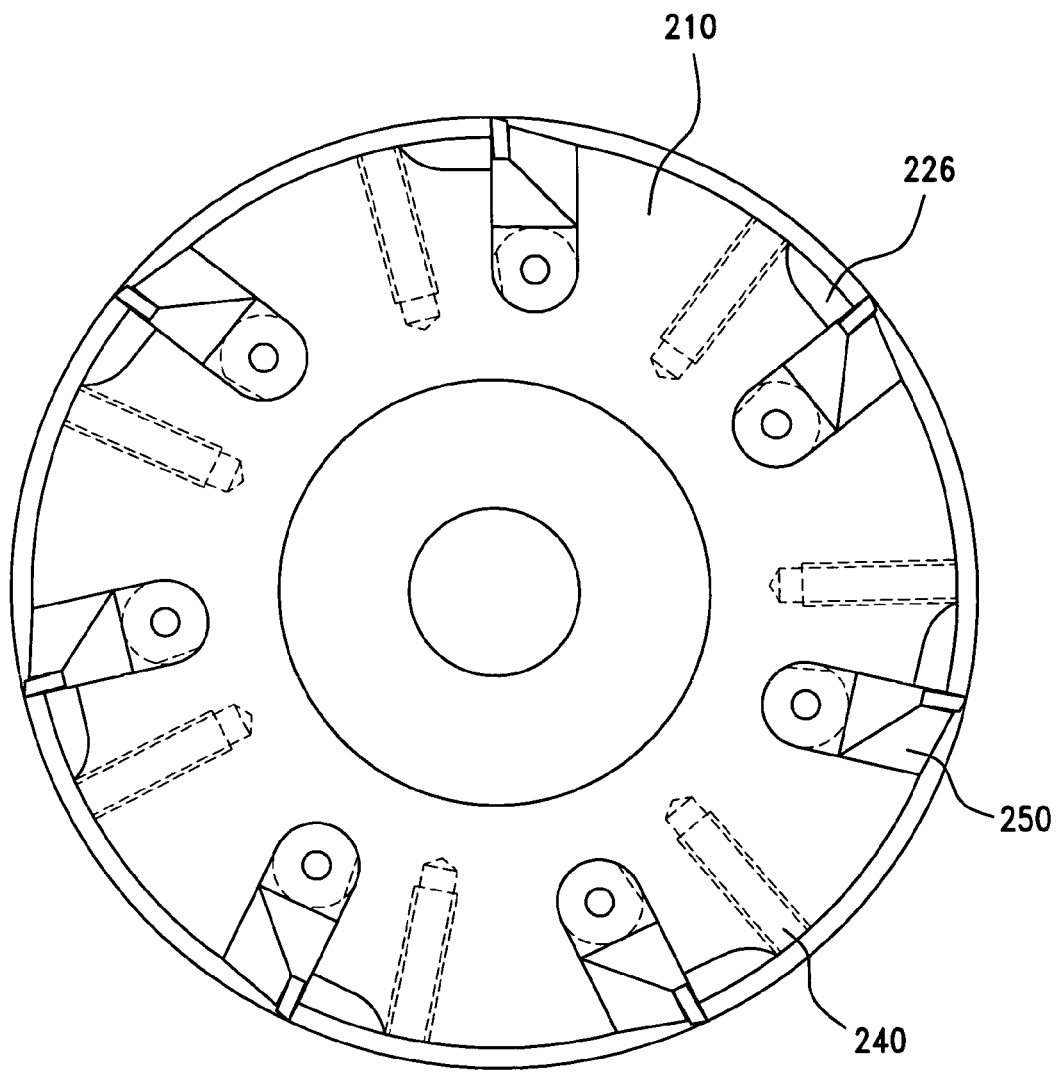
FIG. 21 shows a plan view of the milling head of FIG. 20.

FIGS. 20 and 21 show the milling head, which is constructed from the above-described parts, after the assembly process.

Figure 22:
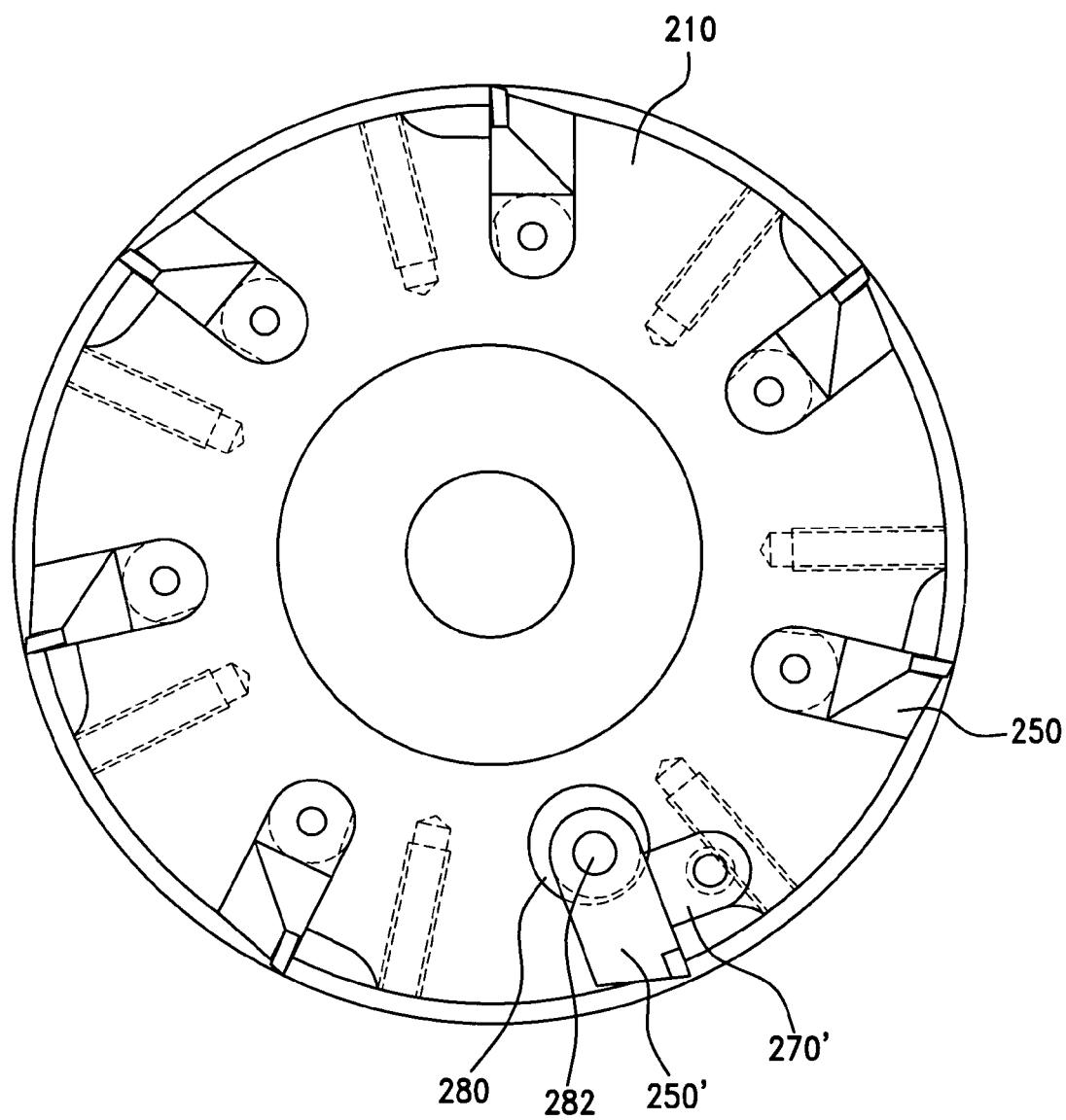
FIG. 22 shows a plan view of a variation of the milling head of FIG. 21.

FIG. 22 illustrates an alternative arrangement of a clamping wedge 270', namely in an axial arrangement instead of the radial arrangement described. In this case, a positive fit is also provided, so that the clamping wedge is no longer able to become detached during operation.

FIG. 22 also illustrates an alternative embodiment, wherein the cutting insert 250' is positioned in an eccentric bushing 280 which is mounted in a positive-fitting manner in the basic body 210. The axis 282 of the receiving bore of the cutting insert 250' is disposed in the eccentric bushing in an offset manner with respect to the central axis. Any rotation of the eccentric bushing 280 causes the cutting insert 250' to be adjusted in the radial direction. For this purpose, it is possible to provide, for example, a threaded engagement in the eccentric bushing.

Figure 24A:
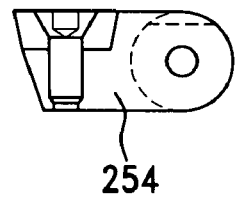
FIG. 24 shows views (a) to (d) of a cutting insert from above (a), from the side, partially cut-away (b), from the side (c) and in cross-section (d)
Figures 24B, 24C:
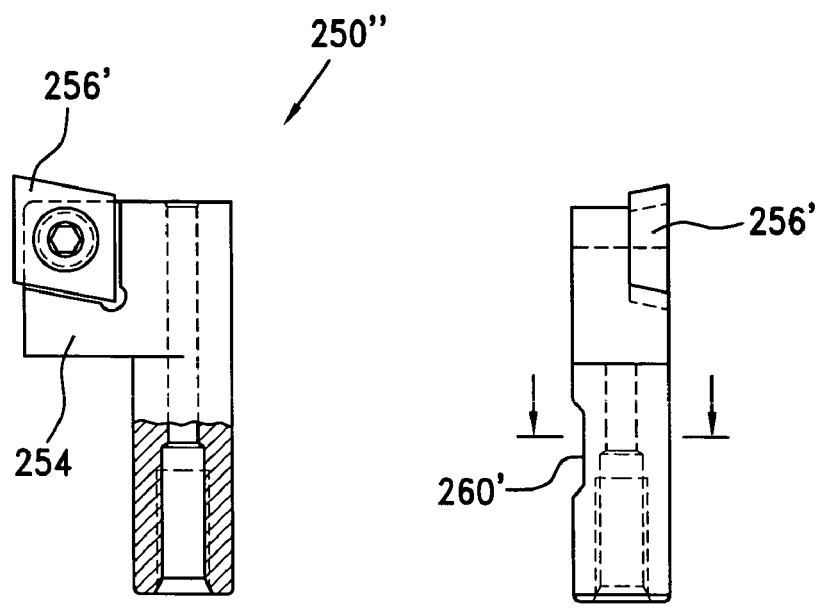
Figure 24D:
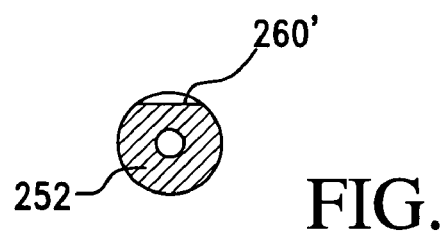

FIG. 24 illustrates an alternative embodiment of a cutting insert 250". Here, the reference numeral 256' designates a screwed-on turning plate. In this case, it is not necessary, for example, to replace everything as in the case of the cutting inserts having a soldered cutter, rather it is possible alternatively to replace merely the turning plate. A recess 260' replaces the planar inclination 260.

Figure 25:
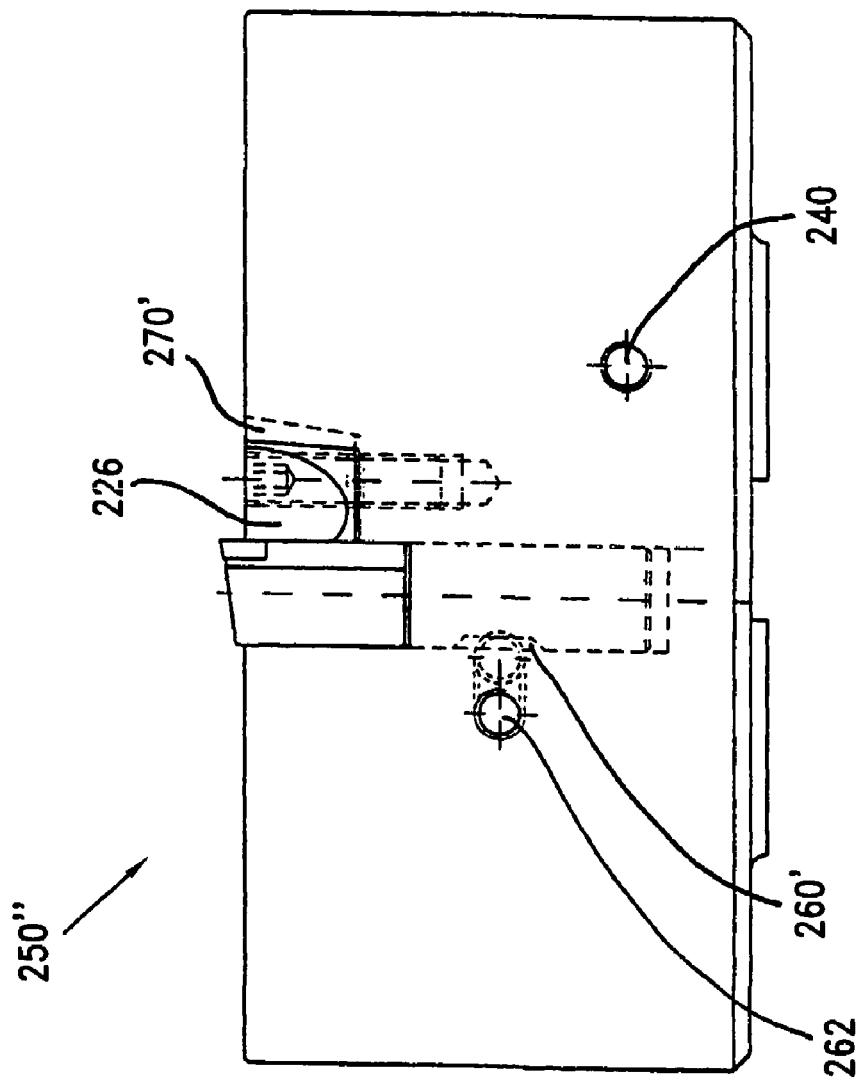
FIG. 25 shows a lateral view of a milling head according to a seventh exemplified embodiment of the invention having a cutting insert as shown in FIG. 24.

FIG. 25 illustrates a lateral view of a cutting insert 250" as shown in FIG. 24, wherein a screw 262 impinging at an angle engages into the recess 260'. A clamping wedge 270' which is disposed in an axial manner is also illustrated.

Figure 26A:
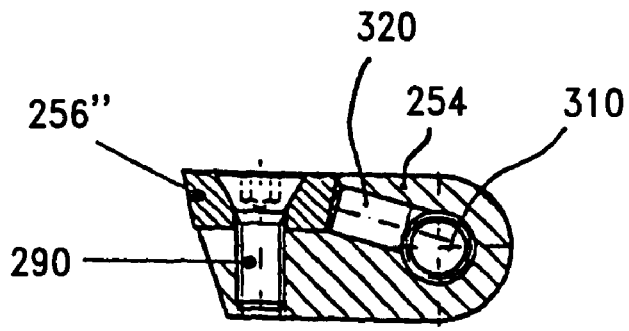
FIG. 26 shows views of an L-shaped cutting insert in cross-section through the short limb (a) and from the side, partially cut-away (b)
Figure 26B:
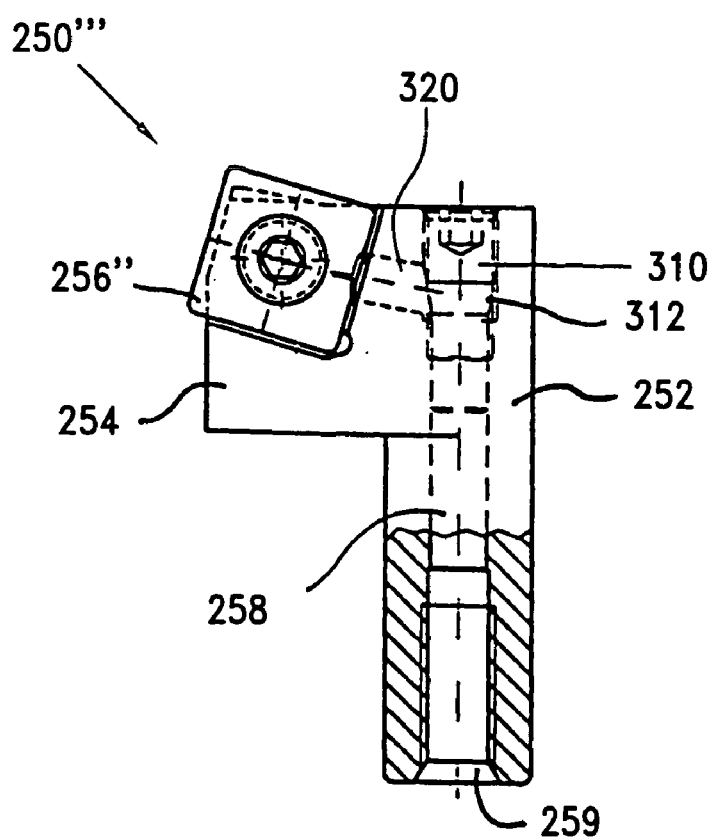

The exemplified embodiment of a cutting insert 250''' as illustrated in FIG. 26 differs from the previous examples by virtue of the fine-adjustment of the cutting plate 256". As previously, an axial threaded bore 258 is provided for the purpose of receiving a differential screw 259 for the axial adjustment of the cutting insert. A pin element, in this case a pin 320, is used for the purpose of performing a fine-adjustment in the diameter direction and lies with its inner end against a conical screw 310 and exerts pressure with its outer end to influence the cutting plate 256" with a pre-stressing force. As the pressure exerted by the pin 320 increases, the cutting plate is adjusted with a change in diameter in the order of 1/100 mm. For these types of pressure changes or fine-adjustments, the conical screw 310 which is positioned in the long shaft 252 is adjusted.

Figure 27:
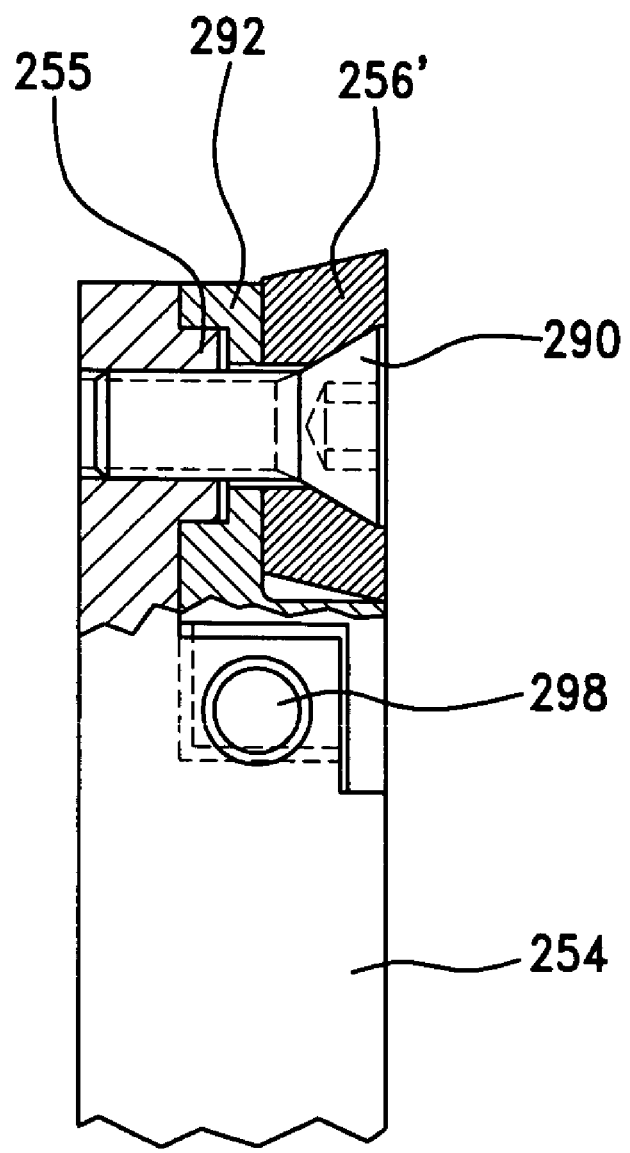
FIGS. 27 and 28 show a partial view and a partial sectional view of a further cutting insert which can be rotated.
Figure 28:
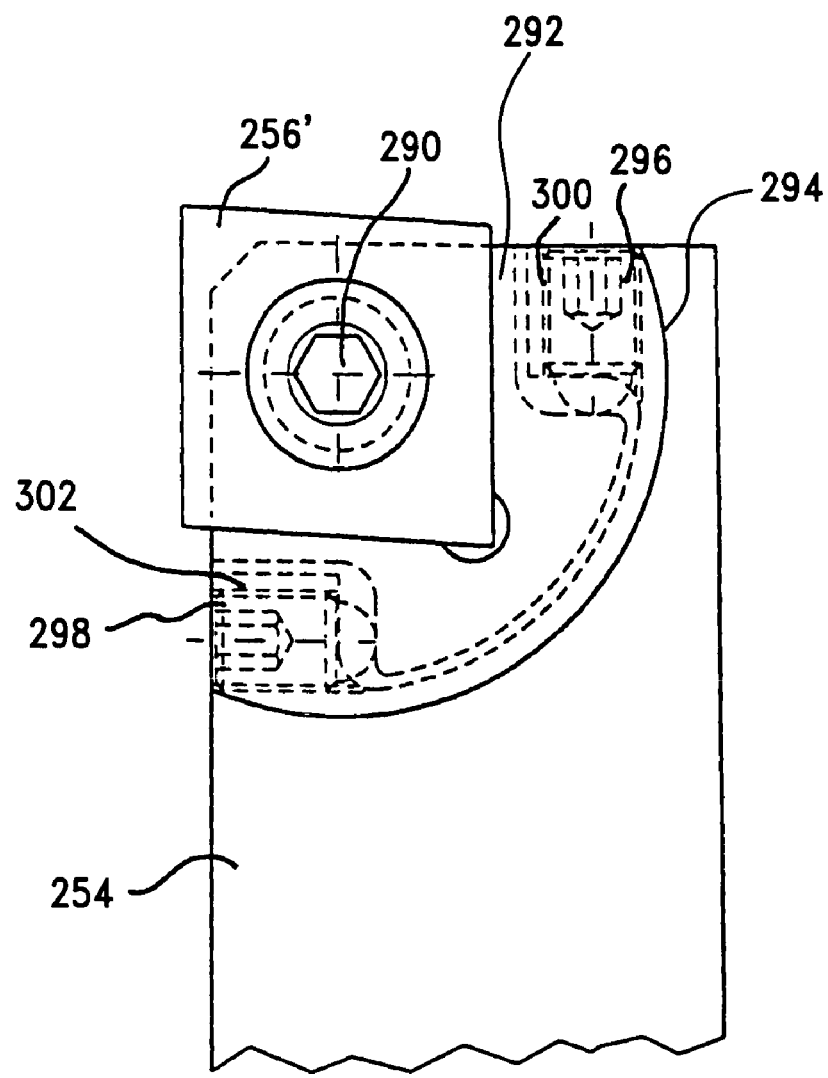

FIGS. 27 and 28 illustrate rotatable cutting inserts. Where the parts are the same as those previously described, they are designated by the same reference numerals. The turning plate 256' is attached by means of a screw 290 in a cutting plate carrier 292 which can be rotated about a pivot coinciding approximately with the screw 290. Accordingly, the short limb 254 of the cutting insert is provided with a bearing surface 294 having a circle sector contour. The cutting plate carrier 292 comprises a collar 255 on the pivot which collar serves to fix the cutting plate carrier in a positive-fitting manner. Two adjusting screws 296, 298 on opposite ends are used to adjust the cutting plate carrier 292. As shown, the adjusting screws 296, 298 can be positioned in adjusting receiving parts 300, 302 in the cutting insert 292. Alternatively, they can be disposed in engagement with adjusting projections on the cutting insert. It is also possible to provide a guide [not illustrated in FIG. 23] for the rotational movement.

Figure 29:
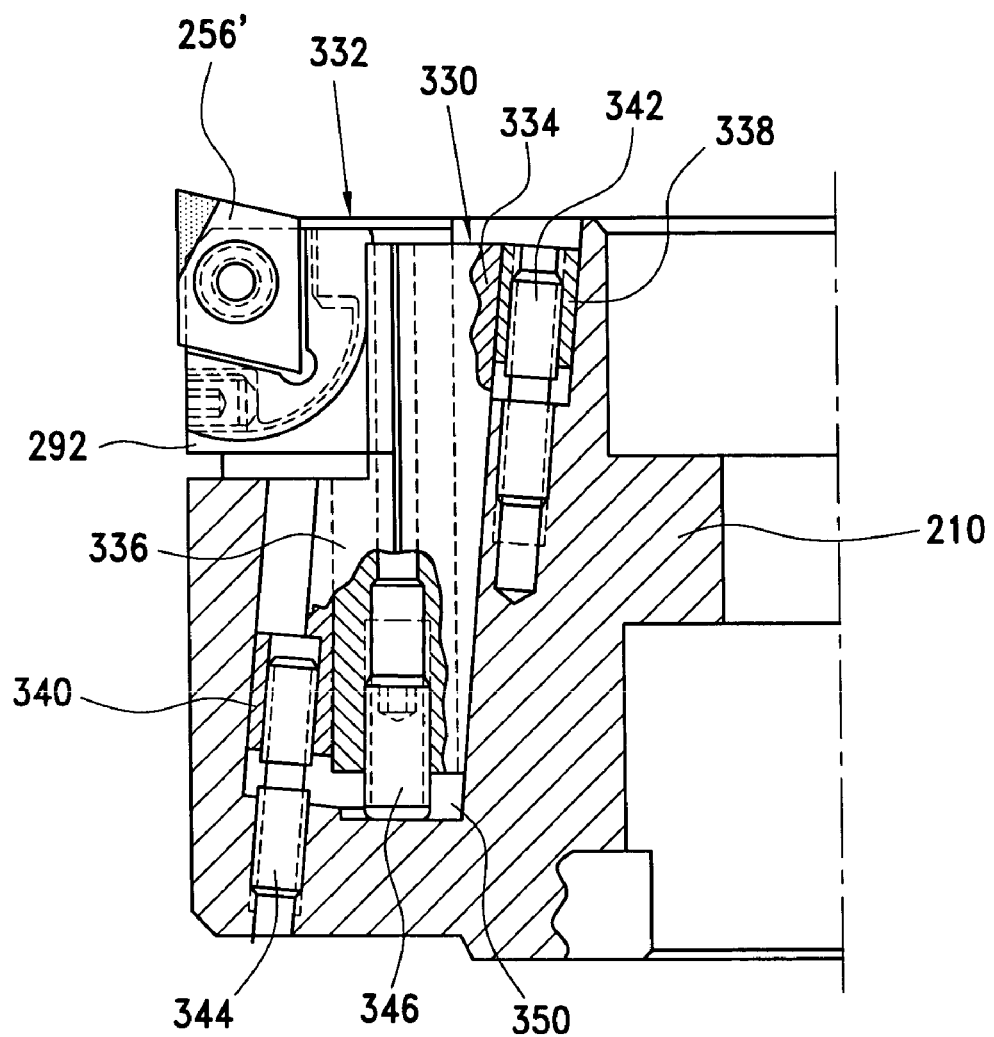
FIG. 29 shows a partial sectional view of a milling head according to an eighth exemplified embodiment of the invention.

FIG. 29 shows a further exemplified embodiment of a milling head in accordance with the invention. This embodiment comprises cutting inserts 292 as shown in FIG. 28. The cutting inserts will therefore not be described again in detail. It is naturally also possible to use different cutting inserts. The cutting inserts 292 are each in engagement with a generally cylindrical adjusting bushing 330 which is mounted in a bearing bore 350 which is inclined (e.g. at 5°) in the basic body 210 in relation to the rotational axis of the milling head. The adjusting bushing 330 is formed in two parts, wherein it comprises parts 334, 336 which are separated by virtue of a separation cut 332 extending in an inclined manner in the longitudinal direction. The two adjusting bushing parts 334, 336 are provided in each case on their broader end face region with a projection 338, 340. Screws 342, 344 which in the illustrated example are designed as differential screws are positioned in the projections 338, 340. The separation cut is guided as shown such that when the adjusting bushing 330 is installed, said separation cut extends in parallel with the rotational axis of the milling head.

The adjusting bushing 330 serves to fine-adjust the cutting insert 292 in the radial direction. This occurs in the following manner: if, for example, the diameter is to be increased in size, the screw 340 is adjusted downwards, whereby the adjusting bushing part 336 which is on the left-hand side in FIG. 29 and is immediately adjacent to the cutting insert is pulled downwards in the direction of the portion of the bearing bore 350 which is broader for this part. Therefore, the clearance between the bearing bushing parts 334, 336 is increased in size and the other adjusting bushing part 334 can be adjusted downwards by means of the other screw 342. As a consequence, the cutting insert 292 is urged outwards and clamped in a fixed manner. An adjusting screw 346 which is aligned in an axially parallel manner with respect to the separation cut 332 serves to adjust the cutting insert 292 in an axial manner.

The invention claimed is:

1. A milling head with a body (210) and cutting inserts (250), wherein each cutting insert is adjustable in recesses (220), a clamping element (270) disposed in a recess (230) for clamping purposes, wherein the cutting insert (250) is integrally made of one piece, wherein the cutting insert (250) is L-shaped, is positioned in a receiving part (222, 224) in a positive-fitting manner and is fixed in its position by means of the clamping element (270), characterised in that the clamping element (270) is a wedge-shaped and is received in the recess (230) in a positive-fitting manner and is angularly offset with respect to the cutting insert receiving recess (220), wherein the cutting insert (250) is provided with an inclined plane surface (260) on the side engaging with the clamping element (270), wherein the clamping element (270) is provided with an inclined plane surface (274) on the side engaging with the cutting insert, and a differential screw is provided for the purpose of adjusting the cutting insert (250).

2. Milling head according to claim 1, characterised in that the cutting insert (250') is positioned in an eccentric bushing (280) which is mounted in a positive-fitting manner.

3. Milling head according to claim 1, characterised in that the cutting insert can be adjusted by means of a wedge or screw.

4. Milling head according to claim 1, characterised in that the body (210) is provided with a receiving bore (350) at an angle with respect to a rotational axis, in which an adjusting bushing (330) for the cutting insert (292) is positioned.

5. Milling head according to claim 4, characterised in that the cutting insert (292) is mounted in a two-part conical bushing (330).

6. Milling head according to claim 1, characterised in that a receiving part (230) for the clamping element (270) is provided and the clamping element is disposed in a displaceable manner in said receiving part.

7. Milling head according to claim 1, characterised in that the receiving part (230) for the clamping element (270) crosses the receiving part (220) of the cutting insert (250).

8. Milling head according to claim 1, characterised in that the inclination (260) is formed at an angle β of about 10°.

9. Milling head according to claim 1, characterised in that an angle α of the inclination (274) of the clamping element (270) is smaller than the angle of the inclination of the cutting insert.

10. Milling head according to claim 9, characterised in that the difference in the inclination angles (β, α) is about 2°.

11. Milling head according to claim 1, characterised in that the cutting insert (250) comprises a cutter (256) which is soldered on to a carrier.

12. Milling head according to claim 1, characterised in that the cutting insert (250) comprises a turning plate (256') which is screwed to a carrier.

13. Milling head according to claim 1, further comprising a cutter or turning plate consists of hard metal, cermet, ceramic, CBN, polycrystalline natural and synthetic diamond as a thin and thick film.

14. Milling head according to claim 1, characterised in that an inclination (260) is located on a long limb (252).

15. Milling head according to claim 1, characterised in that the cutting insert (254) comprises a rotatable cutting plate carrier (292) which supports the cutter.

16. Milling head according to claim 15, characterised in that an adjusting element (310) is a conical screw.

17. Milling head according to claim 1, characterised in that the cutting insert (250) supports a movable cutting plate (256"), against which lies one end of a pin body (320) which impinges at an angle, wherein the pin body (320) exerts pressure outwardly against the cutting plate (256''') and lies with ist other end against an inclined surface (312) of an adjusting element.

18. Milling head according to claim 17, characterised in that the pin body is a pin (320) or a screw.

19. Milling head according to claim 1, characterised in that a cooling arrangement is provided in the body (210).

* * * * *